(12) United States Patent
Yamaji et al.

(10) Patent No.: US 12,385,732 B2
(45) Date of Patent: Aug. 12, 2025

(54) INSIDE-DIAMETER MEASURING UNIT, FLOATING JOINT MECHANISM UNIT, AND MEASURING UNIT

(71) Applicant: MITUTOYO CORPORATION, Kanagawa (JP)

(72) Inventors: Masashi Yamaji, Hiroshima (JP); Yuhei Takatsu, Saitama (JP); Chihiro Yamamoto, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 391 days.

(21) Appl. No.: 18/124,928

(22) Filed: Mar. 22, 2023

(65) Prior Publication Data
US 2023/0324161 A1    Oct. 12, 2023

(30) Foreign Application Priority Data

Mar. 24, 2022 (JP) .................................. 2022-049141

(51) Int. Cl.
*G01B 5/12*    (2006.01)
*B25J 13/08*   (2006.01)

(52) U.S. Cl.
CPC .............. *G01B 5/12* (2013.01); *B25J 13/081* (2013.01)

(58) Field of Classification Search
CPC ...................................................... G01B 5/12
USPC .................................................... 33/542, 543
See application file for complete search history.

(56) References Cited

U.S. PATENT DOCUMENTS

| | | | | |
|---|---|---|---|---|
| 3,959,887 A | * | 6/1976 | Seidel ...................... | G01B 3/46 29/415 |
| 4,192,073 A | * | 3/1980 | Vanderwal, Jr. ......... | G01B 7/13 451/124 |
| 4,265,026 A | * | 5/1981 | Meyer ...................... | G01B 3/26 33/542 |
| 4,521,968 A | * | 6/1985 | Wiltermood ........... | G01B 7/125 33/286 |
| 4,536,963 A | * | 8/1985 | Yamamoto ............... | G01B 5/12 33/544.6 |
| 5,105,554 A | * | 4/1992 | Schnyder ................. | G01B 5/14 33/542 |

(Continued)

FOREIGN PATENT DOCUMENTS

| | | |
|---|---|---|
| JP | H08-14871 A | 1/1996 |
| JP | 2010-19783 A | 1/2010 |

*Primary Examiner* — George B Bennett
(74) *Attorney, Agent, or Firm* — Greenblum & Bernstein, P.L.C.

(57) ABSTRACT

There is provided an inside-diameter measuring unit capable of automating inside-diameter measurement and a control method for automatic inside-diameter measurement. An inside-diameter measuring part is supported by a support frame part via a floating joint part. The floating joint part includes a rotation-allowing mechanism part and a translation-allowing mechanism part. A measuring head part of the inside-diameter measuring part is inserted into a hole by a robot arm part. The inside-diameter measuring part adjusts its position and posture autonomously by the reaction force when a contact point pushes against the inner wall of the hole to align the axis of the inside-diameter measuring part with the axis of the hole. An electric inside-diameter measuring unit can automatically measure the inside diameter of a hole.

13 Claims, 33 Drawing Sheets

(56) References Cited

U.S. PATENT DOCUMENTS

| | | | | |
|---|---|---|---|---|
| 5,157,845 A * | 10/1992 | Possati | .................... | G01B 7/13 |
| | | | | 33/542 |
| 5,379,522 A * | 1/1995 | Jacobs | ................... | G01B 5/252 |
| | | | | 33/542.1 |
| 6,044,571 A * | 4/2000 | Strait | ....................... | G01B 5/08 |
| | | | | 33/832 |
| 6,065,220 A * | 5/2000 | Ohtsuka | ................... | G01B 5/12 |
| | | | | 33/549 |
| 7,636,646 B2 * | 12/2009 | Kojima | ................. | G01B 5/201 |
| | | | | 702/167 |
| 7,913,411 B2 * | 3/2011 | Klepp | ..................... | G01B 3/26 |
| | | | | 33/544.5 |
| 8,033,032 B2 * | 10/2011 | Fujikawa | ............... | G01B 3/008 |
| | | | | 33/813 |
| 10,422,620 B2 * | 9/2019 | Sato | ....................... | G01B 5/012 |
| 11,040,425 B2 * | 6/2021 | Lause | ................ | B23Q 17/2233 |
| 2024/0151506 A1 * | 5/2024 | Takatsu | ................. | B25J 9/1679 |

* cited by examiner

HOLE INSERTION STEP ST100

FIFTH EXEMPLARY EMBODIMENT

SIXTH EXEMPLARY EMBODIMENT

SIXTH EXEMPLARY EMBODIMENT

INSIDE-DIAMETER MEASURING UNIT, FLOATING JOINT MECHANISM UNIT, AND MEASURING UNIT

INCORPORATION BY REFERENCE

This application is based upon and claims the benefit of priority from JP patent application No. 2022-049141, filed on Mar. 24, 2022 (DAS code BE25), the disclosure of which is incorporated herein in its entirety by reference.

BACKGROUND OF THE INVENTION

1. Field of the Invention

The present invention relates to an inside-diameter measuring unit, a floating joint mechanism part, and a measuring unit.

2. Description of Related Art

Measuring devices for measuring the inside diameter of holes are inside-diameter measuring devices, such as hole tests, cylinder gauges, and Borematic (registered trademark) (see, for example, Patent Literature 1: JP 2010-19783 A). However, when using such an inside-diameter measuring device, manual measurement is inevitably required, because its contact point must be moved forward and backward or centering is performed to some extent while the inside-diameter measuring device is inserted in a hole. Therefore, it takes a lot of manpower and time to check the machining accuracy of a hole with such an inside-diameter measuring device.

As an alternative to manual measurement, an air micrometer is an inside-diameter measuring apparatus that automates inside-diameter measurement at production sites (see, for example, Patent Literature 2: JP H8-14871). The air micrometer, which is simply inserted into a hole and blows air out, is a suitable measuring apparatus for automating inside-diameter measurement among the current options.
Patent Literature 1: JP 2010-19783 A
Patent Literature 2: JP H8-14871

SUMMARY OF THE INVENTION

However, air micrometers also have the following disadvantages.

First, air micrometers are very expensive because of their structure. In addition, an air compressor needs to be prepared and maintained. In terms of measurement capability, the repeatability of air micrometers is limited due to their structure, and their measurement range is extremely short (a few hundred micrometers).

A common problem with manual measurement using manual measuring devices has been the demand to automate measurement as inexpensively as possible.

There is a need for a measuring unit that is inexpensive, easy to use, and can automate measurement and a control method for automatic measurement.

For example, there is a need for an inside-diameter measuring unit that is inexpensive, easy to use, and can automatically measure hole diameters and a control method for automatic inside-diameter measurement.

An inside-diameter measuring unit according to an exemplary embodiment of the present invention includes:
an inside-diameter measuring part including a contact point configured to move forward and backward in a direction perpendicular to a cylinder axis of a cylinder case part, the inside-diameter measuring part configured to bring the contact point into contact with an inner wall of a hole to be measured to measure an inside diameter of the hole while the inside-diameter measuring part is inserted in the hole;
a support frame part configured to support the inside-diameter measuring part; and
a floating joint part interposed between the support frame part and the inside-diameter measuring part to allow relative translation and rotation of the inside-diameter measuring part with respect to the support frame part, wherein
the floating joint part includes:
  a rotation-allowing mechanism part configured to allow the rotation of the inside-diameter measuring part with respect to the support frame part; and
  a translation-allowing mechanism part configured to allow translational displacement of the inside-diameter measuring part with respect to the support frame part
the rotation-allowing mechanism part includes a flexible body configured to allow deformation in a direction in which the inside-diameter measuring part is inclined
the translation-allowing mechanism part includes a translation body configured to allow translation of the inside-diameter measuring part in a direction intersecting the cylinder axis of the cylinder case part
the flexible body has one end coupled to the inside-diameter measuring part
the flexible body has the other end coupled to the translation body, and
the translation body is supported in such a manner as to be translatable with respect to the support frame part.

In an exemplary embodiment of the present invention, it is preferable that
the support frame part includes a support base part
the support base part includes a first insertion hole through which the inside-diameter measuring part is inserted
the translation body includes a second insertion hole through which the inside-diameter measuring part is inserted
the inside-diameter measuring part is supported while being inserted in the first insertion hole and the second insertion holes, and
the floating joint part includes a bearing provided around the first insertion hole and the second insertion hole between the translation body and the support base part to allow translation of the translation body with respect to the support base part.

In an exemplary embodiment of the present invention, it is preferable that
the first insertion hole has a larger diameter than a diameter of the second insertion hole
the diameter of the first insertion hole has a size allowing the translation of the inside-diameter measuring part, and
the diameter of the second insertion hole has a size allowing the inclination of the inside-diameter measuring part.

In an exemplary embodiment of the present invention, it is preferable that the flexible body is an elastic body provided to surround the inside-diameter measuring part between the inside-diameter measuring part and the translation body.

In an exemplary embodiment of the present invention, it is preferable that the elastic body is a spring provided to surround the inside-diameter measuring part.

In an exemplary embodiment of the present invention, it is preferable that
  the translation body is disposed above the support base part
  the flexible body has a lower end coupled to the translation body as the other end, and
  the flexible body has an upper end coupled to the inside-diameter measuring part as the one end.

In an exemplary embodiment of the present invention, it is preferable that a position at which the one end of the flexible body is coupled to the inside-diameter measuring part corresponds to a center of gravity of the inside-diameter measuring part.

In an exemplary embodiment of the present invention, it is preferable that the inside-diameter measuring unit further includes an electric drive unit configured to move the contact point forward and backward.

In an exemplary embodiment of the present invention, it is preferable that
  the inside-diameter measuring unit further includes a restriction means for clamping the inside-diameter measuring part from a direction intersecting the cylinder axis, wherein
  the restriction means is configured to clamp and hold the inside-diameter measuring part when the inside-diameter measuring part is not inserted in the hole to be measure, and to release the inside-diameter measuring part when the inside-diameter measuring part is inserted in the hole to be measured.

In an exemplary embodiment of the present invention, it is preferable that the inside-diameter measuring part is supported by the support frame part via the floating joint part when the cylinder axis is oriented in a vertical direction as a reference position.

In an exemplary embodiment of the present invention, it is preferable that the support frame part couples the inside-diameter measuring part to a moving means for moving the inside-diameter measuring part.

A floating joint mechanism part according to an exemplary embodiment of the present invention is a floating joint mechanism part interposed between an object to be supported and a support frame part configured to support the object to be supported, the floating joint mechanism part configured to allow relative translation and rotation of the object to be supported with respect to the support frame part, the floating joint mechanism part includes:
  a rotation-allowing mechanism part configured to allow the rotation of the object to be supported with respect to the support frame part; and
  a translation-allowing mechanism part configured to allow translational displacement of the object to be supported with respect to the support frame part, wherein
  the rotation-allowing mechanism part includes a flexible body configured to allow deformation in a direction in which the object to be supported is inclined
  the translation-allowing mechanism part includes a translation body configured to allow translation of the object to be supported
  the flexible body has one end coupled to the object to be supported
  the flexible body has the other end coupled to the translation body, and
  the translation body is supported in such a manner as to be translatable with respect to the support frame part.

A measuring unit according to an exemplary embodiment of the present invention includes:
  a measuring part configured to bring a contact point into contact with an object to be measured to measure a dimension of the object to be measured;
  a support frame part configured to support the measuring part; and
  a floating joint part interposed between the support frame part and the measuring part to allow relative translation and rotation of the measuring part with respect to the support frame part, wherein
  the floating joint part includes:
    a rotation-allowing mechanism part configured to allow the rotation of the measuring part with respect to the support frame part; and
    a translation-allowing mechanism part configured to allow translational displacement of the measuring part with respect to the support frame part
  the rotation-allowing mechanism part includes a flexible body configured to allow deformation in a direction in which the measuring part is inclined
  the translation-allowing mechanism part includes a translation body configured to allow translation of the measuring part
  the flexible body has one end coupled to the measuring part
  the flexible body has the other end coupled to the translation body, and
  the translation body is supported in such a manner as to be translatable with respect to the support frame part.

An inside-diameter measuring unit according to an exemplary embodiment of the present invention includes:
  an inside-diameter measuring part including a contact point configured to move forward and backward in a direction perpendicular to a cylinder axis of a cylinder case part, the inside-diameter measuring part configured to bring the contact point into contact with an inner wall of a hole to be measured to measure an inside diameter of the hole while the inside-diameter measuring part is inserted in the hole;
  a support frame part configured to support the inside-diameter measuring part; and
  a floating joint part interposed between the support frame part and the inside-diameter measuring part to allow relative translation and rotation of the inside-diameter measuring part with respect to the support frame part, wherein
  the floating joint part includes:
    a coupling block fixedly coupled to the inside-diameter measuring part and configured to be translated and rotated integrally with the inside-diameter measuring part;
    a rotation-allowing mechanism part configured to allow rotation of the coupling block with respect to the support frame part; and
    a translation-allowing mechanism part configured to allow translational displacement of the coupling block in a direction parallel to a plane perpendicular to the cylinder axis with respect to the support frame part
  the rotation-allowing mechanism part includes a sphere disposed between the coupling block and the support frame part, and
  the translation-allowing mechanism part includes:

a guide shaft provided to either one of the coupling block and the support frame part and extending in the direction parallel to the plane perpendicular to the cylinder axis; and a guide hole provided in the other one of the coupling block and the support frame part to receive the guide shaft and allow the guide shaft to slide in the direction parallel to the plane perpendicular to the cylinder axis.

In an exemplary embodiment of the present invention, it is preferable that the guide shaft is one of two guide shafts, and the two guide shafts are provided in mutually orthogonal directions in the plane perpendicular to the cylinder axis.

In an exemplary embodiment of the present invention, it is preferable that the support frame part includes a support ring part surrounding the coupling block in the plane perpendicular to the cylinder axis the support ring part is provided with the two guide shafts, and the coupling block includes a guide hole configured to receive the two guide shafts and allow translation and rotation of the coupling block.

In an exemplary embodiment of the present invention, it is preferable that the coupling block is disposed above an upper end of the inside-diameter measuring part, and the inside-diameter measuring part is supported by the support frame part while being suspended from the support frame part via the floating joint part.

In an exemplary embodiment of the present invention, it is preferable that a position at which the two guide shafts intersect is on an extension of the cylinder axis of the inside-diameter measuring part.

In an exemplary embodiment of the present invention, it is preferable that the inside-diameter measuring unit further includes an electric drive unit configured to move the contact point forward and backward.

In an exemplary embodiment of the present invention, it is preferable that the inside-diameter measuring unit further includes a restriction means for clamping the inside-diameter measuring part or the coupling block to hold the inside-diameter measuring part, wherein the restriction means is configured to hold the inside-diameter measuring part when the inside-diameter measuring part is not inserted in a hole to be measured, and to release the inside-diameter measuring part when the inside-diameter measuring part is inserted in the hole to be measured.

In an exemplary embodiment of the present invention, it is preferable that the inside-diameter measuring part is supported by the support frame part via the floating joint part when the cylinder axis is oriented in a vertical direction as a reference position.

In an exemplary embodiment of the present invention, it is preferable that the support frame part couples the inside-diameter measuring part to a moving means for moving the inside-diameter measuring part.

A floating joint mechanism part according to an exemplary embodiment of the present invention is a floating joint mechanism part interposed between an object to be supported and a support frame part configured to support the object to be supported, the floating joint mechanism part configured to allow relative translation and rotation of the object to be supported with respect to the support frame part, the floating joint mechanism part includes:

a coupling block fixedly coupled to the object to be supported and configured to be translated and rotated integrally with the object to be supported;

a rotation-allowing mechanism part configured to allow rotation of the coupling block with respect to the support frame part; and a translation-allowing mechanism part configured to allow translational displacement of the coupling block with respect to the support frame part the rotation-allowing mechanism part includes a sphere disposed between the coupling block and the support frame part, and the translation-allowing mechanism part includes:

a guide shaft provided to either one of the coupling block and the support frame part and extending in a direction of guiding translation; and a guide hole provided in the other one of the coupling block and the support frame part to receive the guide shaft and allow the guide shaft to slide.

A measuring unit according to an exemplary embodiment of the present invention includes:

a measuring part configured to bring a contact point into contact with an object to be measured to measure a dimension of the object to be measured;

a support frame part configured to support the measuring part; and a floating joint part interposed between the support frame part and the measuring part to allow relative translation and rotation of the measuring part with respect to the support frame part, wherein the floating joint part includes:

a coupling block fixedly coupled to the measuring part and configured to be translated and rotated integrally with the measuring part;

a rotation-allowing mechanism part configured to allow rotation of the coupling block with respect to the support frame part; and a translation-allowing mechanism part configured to allow translational displacement of the coupling block with respect to the support frame part the rotation-allowing mechanism part includes a sphere disposed between the coupling block and the support frame part, and the translation-allowing mechanism part includes:

a guide shaft provided to either one of the coupling block and the support frame part and extending in a direction of guiding translation; and a guide hole provided in the other one of the coupling block and the support frame part to receive the guide shaft and allow the guide shaft to slide.

An inside-diameter measuring unit according to an exemplary embodiment of the present invention includes:

an inside-diameter measuring part including a contact point configured to move forward and backward in a direction perpendicular to a cylinder axis of a cylinder case part, the inside-diameter measuring part configured to bring the contact point into contact with an inner wall of a hole to be measured to measure an inside diameter of the hole while the inside-diameter measuring part is inserted in the hole;

a support frame part configured to support the inside-diameter measuring part; and a floating joint part interposed between the support frame part and the inside-diameter measuring part to allow relative translation and rotation of the inside-diameter measuring part with respect to the support frame part, wherein the floating joint part includes:
  a first floating coupling body fixedly coupled to the inside-diameter measuring part and configured to be translated and rotated integrally with the inside-diameter measuring part;
  a second floating coupling body configured to support the first floating coupling body to allow translation and rotation of the first floating coupling body; and
  a third floating coupling body configured to support the second floating coupling body to allow translation and rotation of the second floating coupling body, and
the third floating coupling body is fixedly attached to the support frame part.

In an exemplary embodiment of the present invention, it is preferable that
  the second floating coupling body supports the first floating coupling body via a first coupling shaft extending in a first direction parallel to a plane perpendicular to the cylinder axis, the first coupling shaft configured to allow axially forward and backward movement and axial rotation, and
  the third floating coupling body supports the second floating coupling body via a second coupling shaft extending in a direction perpendicular to the first direction in the plane perpendicular to the cylinder axis, the second coupling shaft configured to allow axially forward and backward movement and axial rotation.

In an exemplary embodiment of the present invention, it is preferable that
  the first floating coupling body is ring shaped or cylinder shaped and provided to surround the inside-diameter measuring part in the direction perpendicular to the cylinder axis, and
  the second floating coupling body is ring shaped or cylinder shaped and provided to surround the first floating coupling body in the direction perpendicular to the cylinder axis.

In an exemplary embodiment of the present invention, it is preferable that a position at which a first virtual straight line being a virtual extension of the first coupling shaft and a second virtual straight line being a virtual extension of the second coupling shaft intersect is substantially aligned with a center of gravity of the inside-diameter measuring part.

In an exemplary embodiment of the present invention, it is preferable that the inside-diameter measuring unit further includes an electric drive unit configured to move the contact point forward and backward.

In an exemplary embodiment of the present invention, it is preferable that
  the inside-diameter measuring unit further includes a restriction means for clamping the inside-diameter measuring part from a direction intersecting the cylinder axis, wherein
  the restriction means is configured to clamp and hold the inside-diameter measuring part when the inside-diameter measuring part is not inserted in a hole to be measured, and to release the inside-diameter measuring part when the inside-diameter measuring part is inserted in the hole to be measured.

In an exemplary embodiment of the present invention, it is preferable that the inside-diameter measuring part is supported by the support frame part via the floating joint part when the cylinder axis is oriented in a vertical direction as a reference position.

A floating joint mechanism part according to an exemplary embodiment of the present invention is a floating joint mechanism part interposed between an object to be supported and a support frame part configured to support the object to be supported, the floating joint mechanism part configured to allow relative translation and rotation of the object to be supported with respect to the support frame part, the floating joint mechanism part includes:
  a first floating coupling body fixedly coupled to the object to be supported and configured to be translated and rotated integrally with the object to be supported;
  a second floating coupling body configured to support the first floating coupling body to allow translation and rotation of the first floating coupling body; and
  a third floating coupling body configured to support the second floating coupling body to allow translation and rotation of the second floating coupling body, wherein
the third floating coupling body is fixedly attached to the support frame part.

A measuring unit according to an exemplary embodiment of the present invention includes:
  a measuring part configured to bring a contact point into contact with an object to be measured to measure a dimension of the object to be measured;
  a support frame part configured to support the measuring part; and
  a floating joint part interposed between the support frame part and the measuring part to allow relative translation and rotation of the measuring part with respect to the support frame part, wherein
the floating joint part includes:
  a first floating coupling body fixedly coupled to the measuring part and configured to be translated and rotated integrally with the measuring part;
  a second floating coupling body configured to support the first floating coupling body to allow translation and rotation of the first floating coupling body; and
  a third floating coupling body configured to support the second floating coupling body to allow translation and rotation of the second floating coupling body, and
the third floating coupling body is fixedly attached to the support frame part.

A control method of an automatic inside-diameter measuring apparatus, the automatic inside-diameter measuring apparatus including:
  an inside-diameter measuring part including a contact point configured to move forward and backward in a direction perpendicular to a cylinder axis of a cylinder case part, an electric drive unit configured to move the contact point forward and backward, and a displacement detection part configured to detect displacement of the contact point;
  a moving means for relatively moving the inside-diameter measuring part with respect to an object to be measured to insert and retract the inside-diameter measuring part into and from a hole to be measured; and
  a control unit configured to control operation of the inside-diameter measuring part and the moving means, the control method includes:
  a hole insertion step of inserting, by the moving means, the inside-diameter measuring part into the hole to be measured;

a measurement step of bringing the contact point into contact with an inner wall of the hole to measure an inside diameter of the hole; and a hole retraction step of retracting the inside-diameter measuring part from the hole by the moving means.

In an exemplary embodiment of the present invention, it is preferable that the automatic inside-diameter measuring apparatus further includes:

a support frame part configured to support the inside-diameter measuring part and to couple the inside-diameter measuring part to the moving means; and a floating joint part interposed between the support frame part and the inside-diameter measuring part to allow relative translation and rotation of the inside-diameter measuring part with respect to the support frame part the hole insertion step including temporarily stopping drive of the moving means after the inside-diameter measuring part is inserted by the moving means into the hole to be measured, and the measurement step includes an autonomous adjustment step of autonomously adjusting, by the inside-diameter measuring part, a position and posture of the inside-diameter measuring part itself to align the cylinder axis of the cylinder case part with an axis of the hole to be measured while the inside-diameter measuring part is relatively displaced with respect to the support frame part by a reaction force applied to the inside-diameter measuring part from the inner wall of the hole to be measured when the electric drive unit moves the contact point forward and brings the contact point into contact with the inner wall of the hole to be measured.

In an exemplary embodiment of the present invention, it is preferable that the automatic inside-diameter measuring apparatus further includes a restriction means for clamping the inside-diameter measuring part from a direction intersecting the cylinder axis the restriction means is configured to switch between a holding state and a release state of the inside-diameter measuring part by performing a holding step of clamping and restricting the inside-diameter measuring part and a release step of releasing the restriction of the inside-diameter measuring part the restriction means maintains the holding state of the inside-diameter measuring part during the hole insertion step and the hole retraction step, and the measurement step includes performing, by the restriction means, the releasing step before the autonomous adjustment step to release the restriction of the inside-diameter measuring part.

In an exemplary embodiment of the present invention, it is preferable that the control unit includes a drive control unit configured to control the electric drive unit the measurement step includes:

a first forward movement step of moving, by the drive control unit, the contact point forward until the contact point is brought into first contact with the inner wall of the hole to be measured;

a backward movement step of moving, by the drive control unit, the contact point backward slightly in an opposite direction after the first forward movement step; and a second forward movement step of moving, by the drive control unit, the contact point forward again after the backward movement step to perform the autonomous adjustment step.

In an exemplary embodiment of the present invention, it is preferable that the releasing step is performed before the first forward movement step.

In an exemplary embodiment of the present invention, it is preferable that the releasing step is performed after the first forward movement step.

In an exemplary embodiment of the present invention, it is preferable that a constant pressure mechanism configured to regulate an upper limit of the reaction force applied to the contact point from the inner wall of the hole to be measured is provided in a force transmission path from the electric drive unit to the contact point, and the drive control unit terminates the second forward movement step when the constant pressure mechanism is activated.

In an exemplary embodiment of the present invention, it is preferable that the automatic inside-diameter measuring apparatus further includes a collision detection part configured to detect that the inside-diameter measuring part has collided with an object, and the hole insertion step is stopped when the collision detection part detects a collision.

A control method of an automatic measuring apparatus, the automatic measuring apparatus including:

a measuring part including a contact point provided to move forward and backward with respect to a fixed element, an electric drive unit configured to move the contact point forward and backward, and a displacement detection part configured to detect displacement of the contact point;

a moving means for relatively moving the measuring part with respect to an object to be measured to bring the measuring part closer to or in contact with the object to be measured; and a control unit configured to control operation of the measuring part and the moving means, the control method includes:

an approaching step of bringing, by the moving means, the measuring part closer to the object to be measured;

a measurement step of bringing the contact point into contact with the object to be measured to measure a dimension of the object to be measured; and a retraction step of retracting, by the moving means, the measuring part from the object to be measured.

In an exemplary embodiment of the present invention, it is preferable that the automatic measuring apparatus further includes:

a support frame part configured to support the measuring part and to couple the measuring part to the moving means; and a floating joint part interposed between the support frame part and the measuring part to allow relative translation and rotation of the measuring part with respect to the support frame part the approaching step including temporarily stopping drive of the moving means after the measuring part is brought, by the moving means, closer to or into contact with the object to be measured, and the measurement step includes an autonomous adjustment step of autonomously adjusting, by the measuring part, a position and posture of the measuring part itself while the measuring part is relatively displaced with respect to the support frame part by a reaction force applied to the measuring part from object to be measured when the electric drive unit moves the contact point forward and brings the contact point into contact with object to be measured.

DETAILED DESCRIPTION

Figure 1:
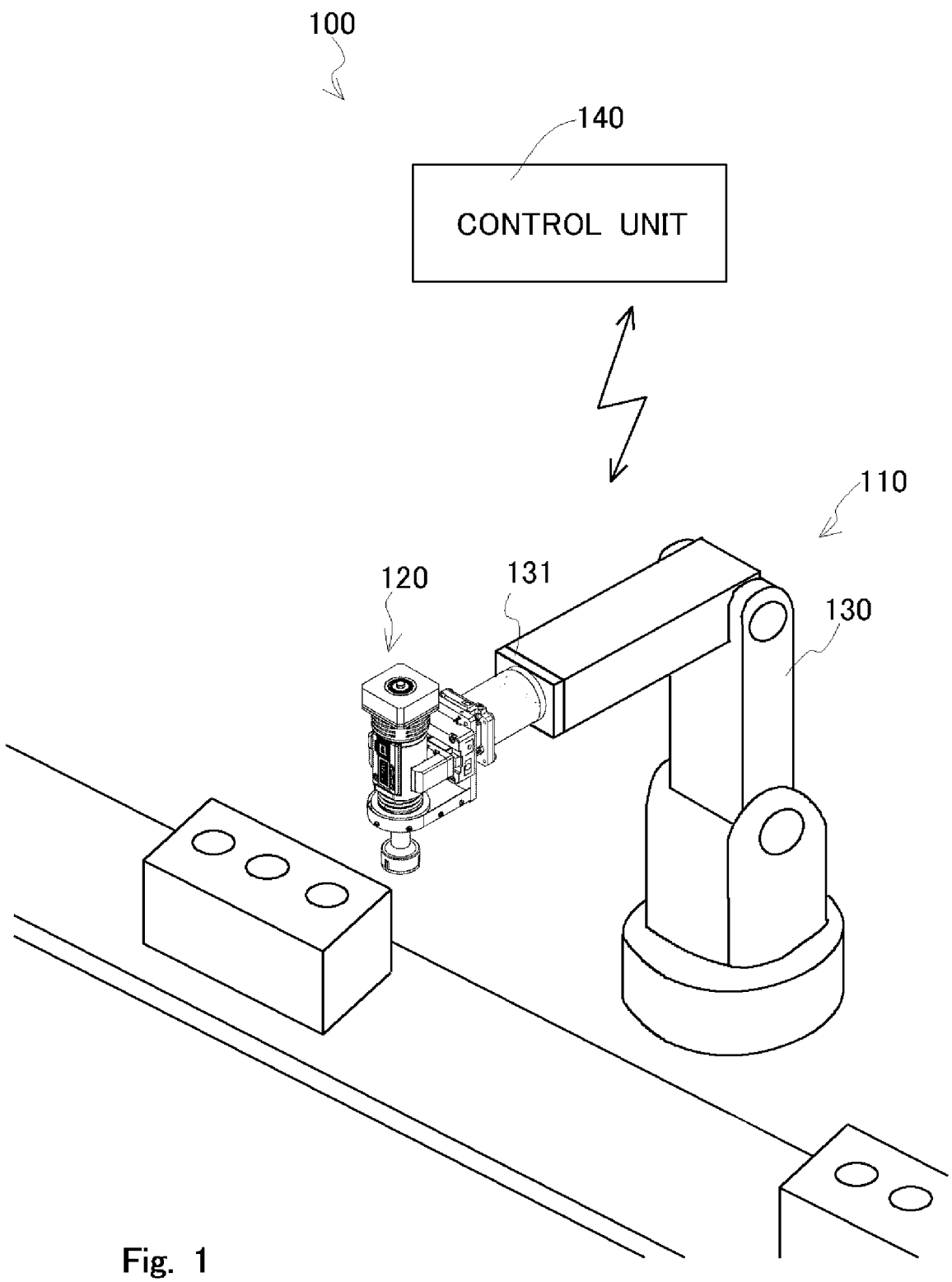
FIG. 1 is an external view of an entire automatic inside-diameter measuring apparatus.

Exemplary embodiments of the present invention are illustrated and described with reference to the reference signs assigned to the elements in the drawings.

First Exemplary Embodiment

In the following, a first exemplary embodiment of the present invention is described.

The present exemplary embodiment describes an automatic inside-diameter measuring apparatus 100 that automates the measurement of the inside diameter (hole diameter) of a hole to be measured.

(Automatic Inside-Diameter Measuring Apparatus)

FIG. 1 is an external view of the entire automatic inside-diameter measuring apparatus 100.

The automatic inside-diameter measuring apparatus 100 includes a measuring-apparatus main body 110 and a control unit 140 that controls the overall operation.

(Measuring-Apparatus Main Body 110)

The measuring-apparatus main body 110 includes an electric inside-diameter measuring unit 120 that measures the hole diameter of an object to be measured, and a multi-joint robot arm part (robot arm part) 130 as a moving means for moving the electric inside-diameter measuring unit 120.

(Electric Inside-Diameter Measuring Unit 120)

The electric inside-diameter measuring unit 120 is attached to and held by a hand part 131, which is the tip of the robot arm part 130. The electric inside-diameter measuring unit 120 is inserted into a hole that is an object to be measured to measure the inside diameter. In addition, the electric inside-diameter measuring unit 120 has a function to autonomously adjust its own position and posture to accurately measure a hole that is an object to be measured.

The configuration of the electric inside-diameter measuring unit 120 is described.

Figure 2:
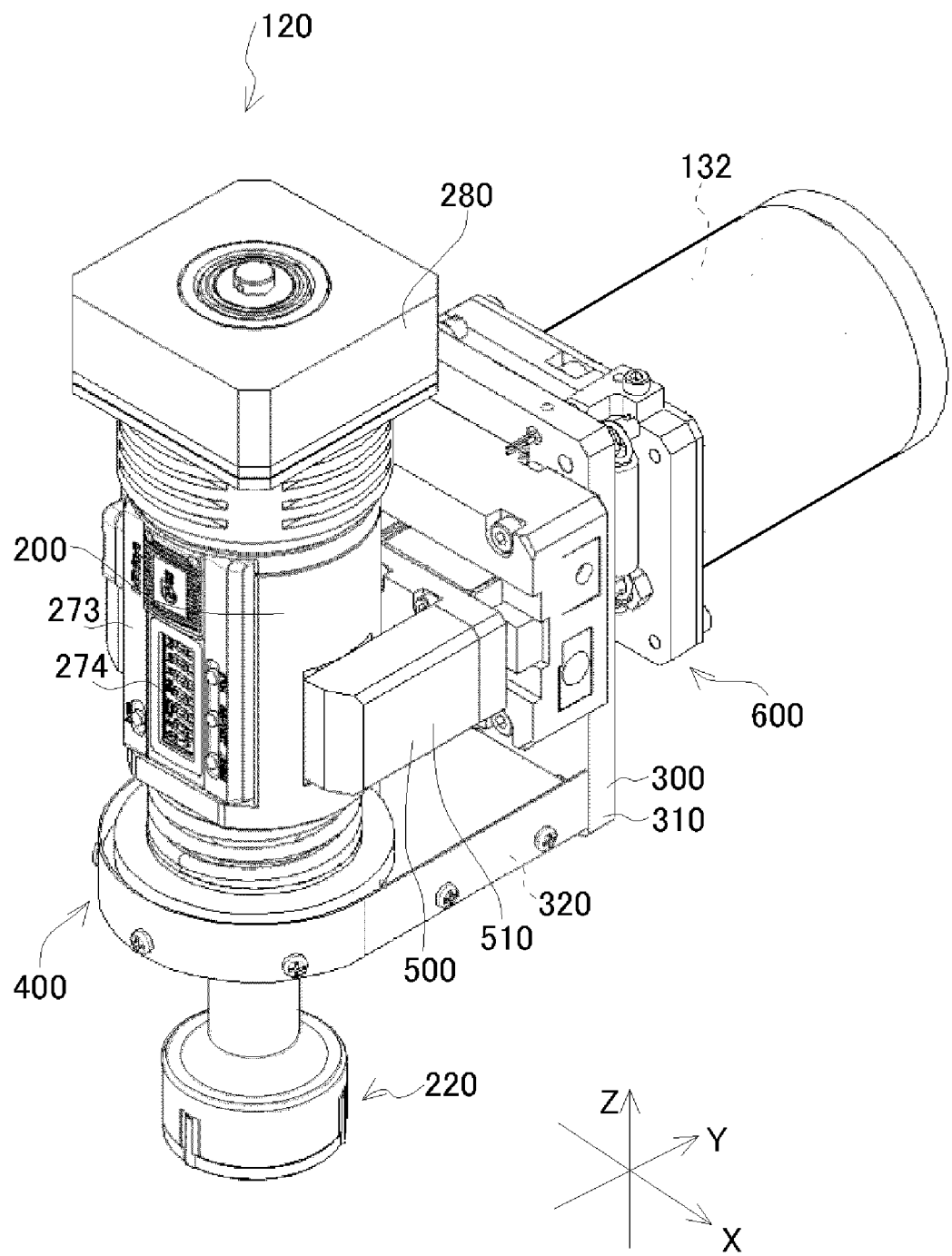
FIG. 2 is an external perspective view of an electric inside-diameter measuring unit when viewed from a slightly front side.

FIG. 2 is an external perspective view of the electric inside-diameter measuring unit 120 when viewed from a slightly front side.

Figure 3:
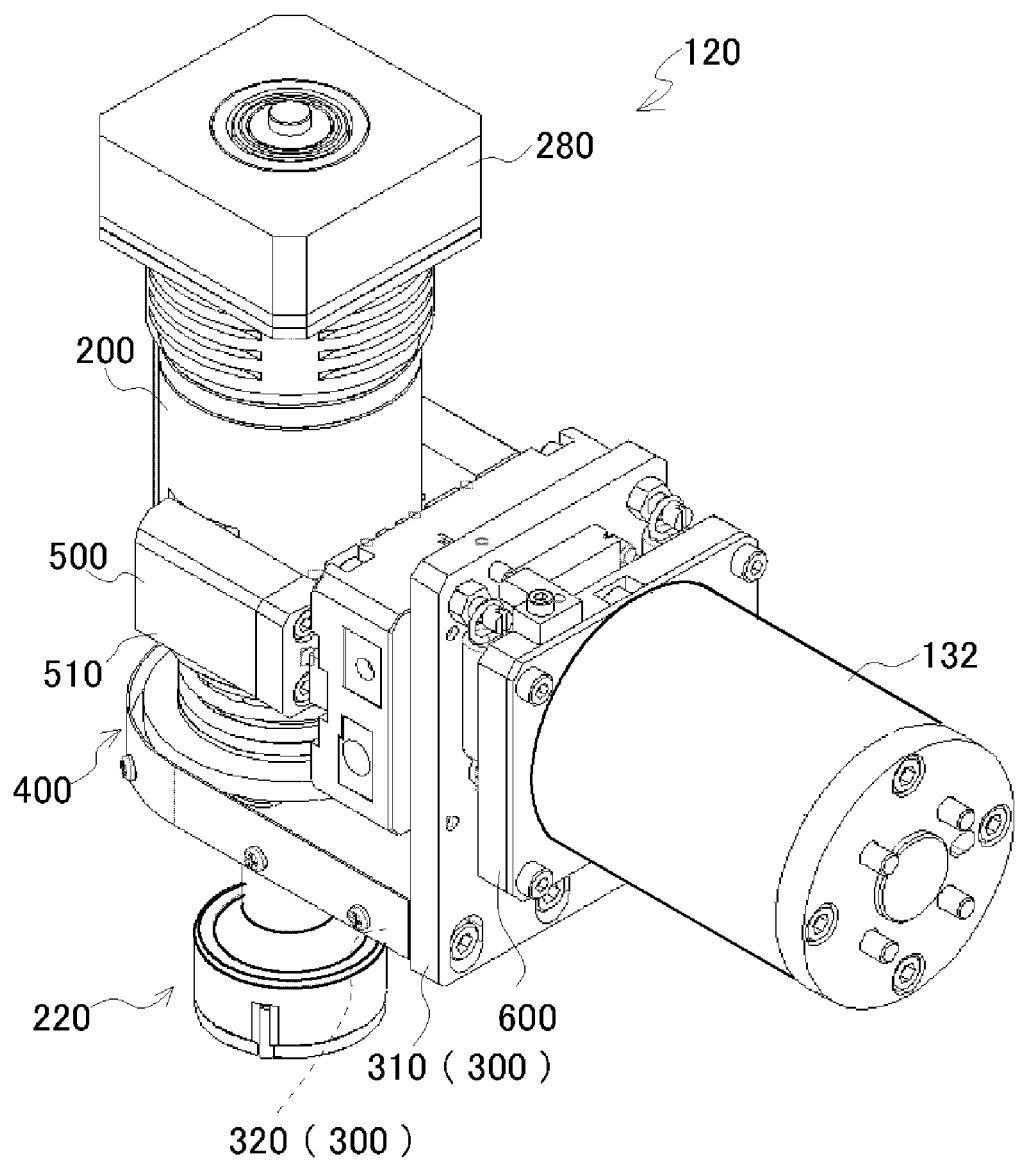
FIG. 3 is an external perspective view of the side of the electric inside-diameter measuring unit when viewed from a slightly rear side.

FIG. 3 is an external perspective view of the side of the electric inside-diameter measuring unit 120 when viewed from a slightly rear side.

Figure 4:
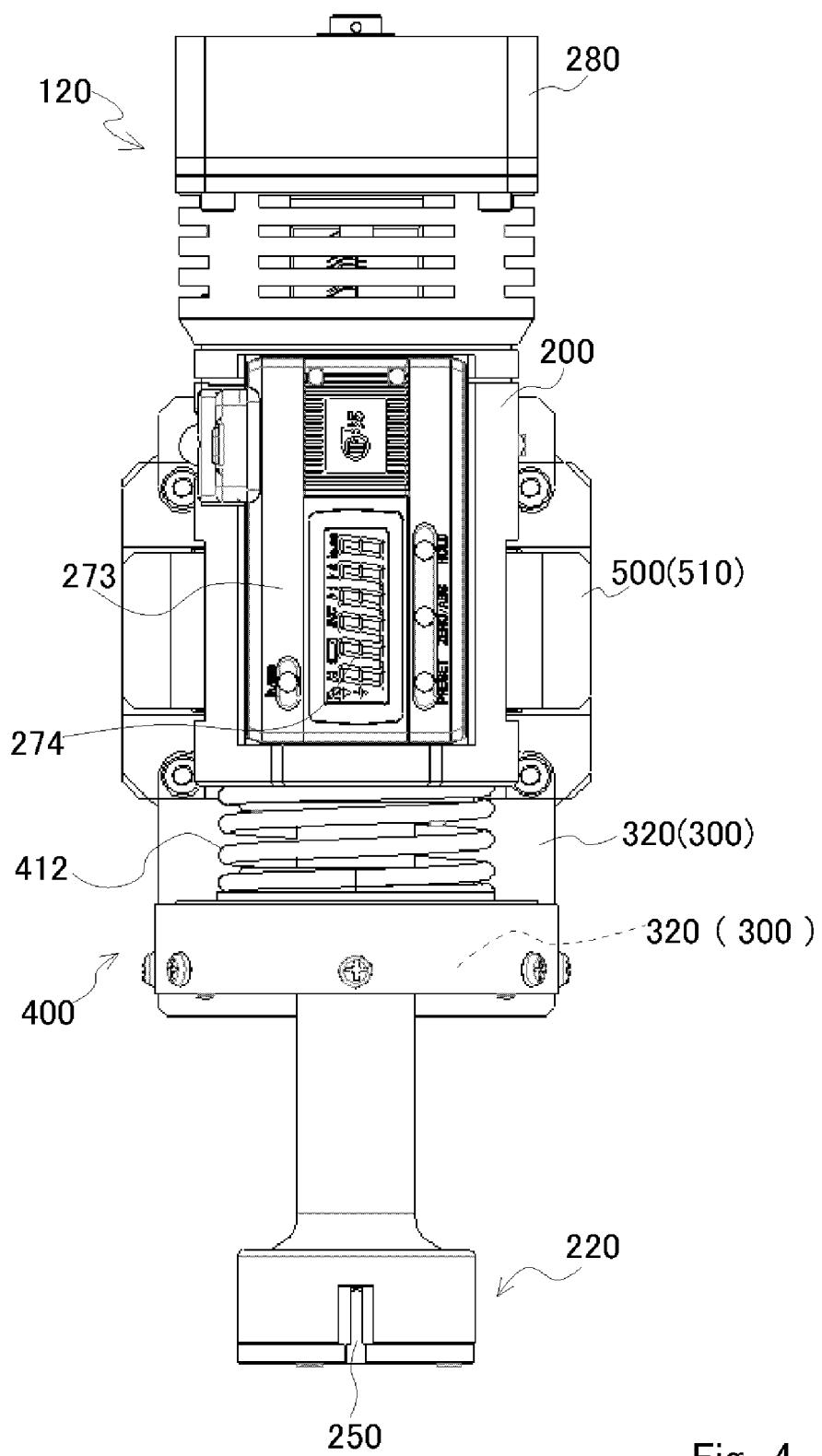
FIG. 4 is a front view of the electric inside-diameter measuring unit.

FIG. 4 is a front view of the electric inside-diameter measuring unit 120.

The electric inside-diameter measuring unit 120 includes an electric inside-diameter measuring device (object to be supported) 200, a support frame part 300, a floating joint part (floating joint mechanism part) 400, a restriction means 500, a collision detection part 600, and a force sensor part 132.

(Electric Inside-Diameter Measuring Device 200)

The electric inside-diameter measuring device 200 is an electric version of the rod feed of an existing manual inside-diameter measuring device (for example, Hole test).

Figure 5:
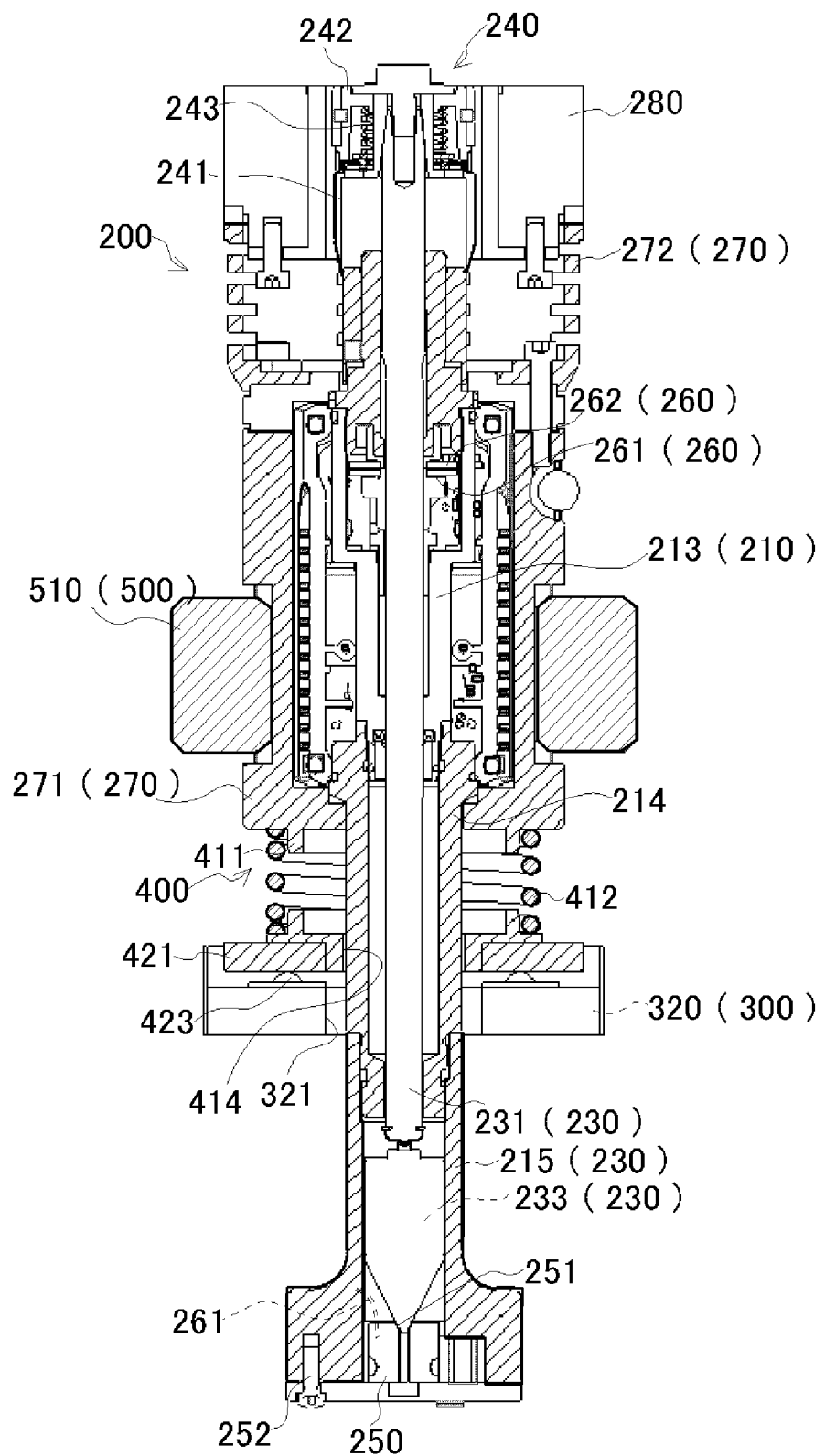
FIG. 5 is a cross-sectional view for showing the internal structure of an electric inside-diameter measuring device.

FIG. 5 is a cross-sectional view for showing the internal structure of the electric inside-diameter measuring device 200.

The electric inside-diameter measuring device 200 includes a cylinder case part (fixed element) 210, a rod 230, a thimble part 240, a contact point (movable element) 250, a displacement detection part 260, an outer case part 270, a display unit 273, and an electric drive unit 280.

The cylinder case part 210 is a case having a cylindrical shape as a whole.

The rod 230 moves axially forward and backward inside the cylinder case part 210.

The cylinder case part 210 includes an upper cylinder case part 211 constituting an upper part, a middle cylinder case part 213 constituting a middle part, a lower cylinder case part 214 constituting a lower part, and a head cylinder part 215 constituting a measuring head part 220.

The middle cylinder case part 213 is attached to the lower end of the upper cylinder case part 211, the lower cylinder case part 214 is attached to the lower end of the middle cylinder case part 213, and the head cylinder part 215 is attached to the lower end of the lower cylinder case part 214.

The rod 230 is a long rod-shaped body as a whole. The rod 230 includes an upper rod 231 and a lower rod 233. The upper rod 231 is a spindle and has a feed screw (male thread) 232 on the outer surface of its base end (upper end side). The upper cylinder case part 211 has a female thread 212, and the feed screw 232 is screwed with the female thread 212.

The thimble part 240 is provided at the base end (upper end side) of the upper rod 231.

The thimble part 240 includes a thimble sleeve 241, a ratchet sleeve 242, and a coil spring 243.

The thimble sleeve 241 is fitted externally to the base end of the upper rod 231 (rod 230) by a tapered surface fit and is adhered to the base end of the upper rod 231 (rod 230).

The ratchet sleeve 242 is a cylindrical body provided above the thimble sleeve 241, and the coil spring 243 is interposed between the thimble sleeve 241 and the ratchet sleeve 242. A push screw is screwed onto the base end face of the upper rod 231, and the ratchet sleeve 242 is pushed by the head flange of the push screw. At this time, the coil spring 243 is sandwiched between the ratchet sleeve 242 and the thimble sleeve 241.

Between the ratchet sleeve 242 and the thimble sleeve 241, a ratchet mechanism (not shown) is provided. Here, the rotation direction of the ratchet sleeve 242, the thimble sleeve 241, or the rod 230 in the direction of feeding the rod 230 downward (in the direction of protruding the contact point 250) is a positive rotation direction. In contrast, the rotation direction of the ratchet sleeve 242, the thimble sleeve 241, or the rod 230 in the direction of feeding the rod 230 upward (the direction in which the contact point 250 is moved backward) is a negative rotation direction. The ratchet mechanism allows the ratchet sleeve 242 to idle against the thimble sleeve 241 in the positive rotation direction and does not allow the ratchet sleeve 242 to idle in the negative rotation direction.

When the ratchet sleeve 242 is subjected to (positive) rotary operation, the rotation of the ratchet sleeve 242 is transmitted to the rod 230 via the coil spring 243 and the thimble sleeve 241.

There is an upper limit to the force (rotational force) transmitted from the ratchet sleeve 242 to the rod 230. That is, if the rod 230 is attempted to be rotated with a force exceeding the frictional force (static frictional force) acting between the ratchet sleeve 242, the coil spring (load regulating elastic body) 243, and the thimble sleeve 241, the ratchet mechanism causes the ratchet sleeve 242 to idle against the thimble sleeve 241. The thimble part 240 constitutes a constant pressure mechanism that regulates the upper limit of the force (measuring force) acting between an object to be measured and the contact point 250. Conversely, a predetermined force (measuring force), which can be defined by the indentation amount of the push screw, is generated between the object to be measured and the contact point 250, and when the contact point 250 applies the predetermined force (measuring force) to the object to be measured, the reaction force is applied to the contact point 250, that is, the electric inside-diameter measuring device 200.

The lower rod 233 is provided inside the head cylinder part 215.

The upper end of the lower rod 233 is in contact with the lower end of the upper rod 231. The lower end of the lower rod 233 is conical.

The contact point 250 is provided in the head cylinder part 215 to move forward and backward in a direction perpendicular to the axial direction of the rod 230.

Three contact points 250 are provided at 120° intervals in the head cylinder part 215. Each contact point 250 has a thin round shaft tip 252 made of carbide at its outer end. When each contact point 250 moves forward in the protruding direction, the round shaft tip 252 is brought into contact with the inner wall of the object to be measured.

The inner end side of each contact point 250 is formed with a tapered surface 251, and the tapered surface 251 is brought into contact with the conical surface of the lower rod 233. The conical surface of the lower rod 233 and the tapered surface 251 of each contact point 250 constitute a displacement direction conversion means for changing the direction of force and displacement to a right angle.

Inside the head cylinder part 215, a spring 216 (for example, plate spring) corresponding to each contact point 250 is provided, one end of the plate spring 216 is fixed to the inner wall of the head cylinder part 215, and the other end of the plate spring 216 is fixed to the contact point 250.

Each plate spring 216 biases the corresponding contact point 250 in the direction of being accommodated in the head cylinder part 215. When the rod 230 is pulled upward by an external force, the force of the plate spring 216 causes the contact point 250 to follow the rod 230 and to move in the direction of entering the head cylinder part 215.

The part of the head cylinder part 215 (the tip end part of the inside-diameter measuring device) where the contact point 250 is protruded and accommodated is also referred to as the measuring head part 220.

The displacement detection part 260 is provided inside the middle cylinder case part 213 to detect displacement of the upper rod 231.

The displacement detection part 260 is what is called a rotary encoder including a rotor 261 provided to rotate integrally with the upper rod 231, a stator 262 that counts the rotation of the rotor 261, and a signal processing calculation unit (not shown). The detection method of the displacement detection part 260 is not particularly limited, and examples of the displacement detection part 260 include a photoelectric encoder, a capacitive encoder, an electromagnetic induction encoder, a magnetic encoder, and the like.

The outer case part 270 is an outer cylinder part that covers the outside of the cylinder case part 210. The outer case part 270 is provided to cover the electric inside-diameter measuring device 200 above the middle of the lower cylinder case part 214. The outer case part 270 is constituted by two parts of an outer case body part 271 that accommodates the middle part thereinside and an outer case upper part 272 that accommodates the upper part thereinside. The outer case body part 271 is a cylindrical body that covers the entire middle cylinder case part 213 corresponding to the middle part of the electric inside-diameter measuring device 200, as well as the upper end side of the lower cylinder case part 214 and the lower end side of the upper cylinder case part 211.

The outer case upper part 272 is a cylindrical body connected to the upper end of the outer case body part 271 and covers the upper cylinder case part 211 constituting the upper part of the electric inside-diameter measuring device 200.

The display unit 273 includes a display part 274 and is attached to the side openings of the middle cylinder case part 213 and the outer case body part 271 to close the openings. The display part 274 is the digital display part 274 (for example, a liquid crystal display panel or an organic EL display panel) fitted into the central area of the display unit 273. The display part 274 shows measurement values and other information calculated by the signal processing calculation unit (not shown).

The display unit 273 is provided with a connector, and measurement values calculated by the signal processing calculation unit (not shown) are output externally.

The electric drive unit 280 is a drive unit that rotates the ratchet sleeve 242 of the thimble part 240. The electric drive unit 280 is attached above the outer case upper part 272. The electric drive unit 280 is, for example, a motor, and the rotational output of the motor is transmitted to the ratchet sleeve 242 via a power transmission mechanism (a gear train, a coupling belt, a coupling shaft, a coupling link, or the like).

The operation of the electric inside-diameter measuring device 200 is basically the same as that of an existing manual inside-diameter measuring device, except that the rod is fed by the electric drive unit 280.

When the rod 230 is moved forward and backward by electric power, the contact points 250 are protruded from and accommodated in the head cylinder part 215 in accordance with the movement of the lower rod 233. By detecting the displacement (position) of the rod 230 when the three contact points 250 are in even contact with the inner wall of a hole to be measured, the inside diameter of the hole to be measured is obtained as a measurement value.

(Support Frame Part 300)

The support frame part 300 is an L-shaped member in side view and includes a support column part 310 and a support base part 320. The support base part 320 is attached to the lower end of the support column part 310 at right angles in the vertical direction.

The support column part 310 is adjacent and parallel to the electric inside-diameter measuring device 200. The restriction means 500 is provided on the front face side of the support column part 310, and the restriction means 500 switches between holding and releasing of the electric inside-diameter measuring device 200. This point is described later.

The support base part 320 is provided by being bent in an L-shape from the lower end of the support column part 310 toward the electric inside-diameter measuring device 200.

The support base part 320 includes a first insertion hole 321 through which the head cylinder part 215 of the electric inside-diameter measuring device 200 is inserted. The electric inside-diameter measuring device 200 is attached in such a manner that the upper part above the lower cylinder case part 214 is placed on the support base part 320 via the floating joint part 400 while the head cylinder part 215 has passed through the first insertion hole 321.

(Floating Joint Part 400)

The floating joint part 400 is described.

Figure 6:
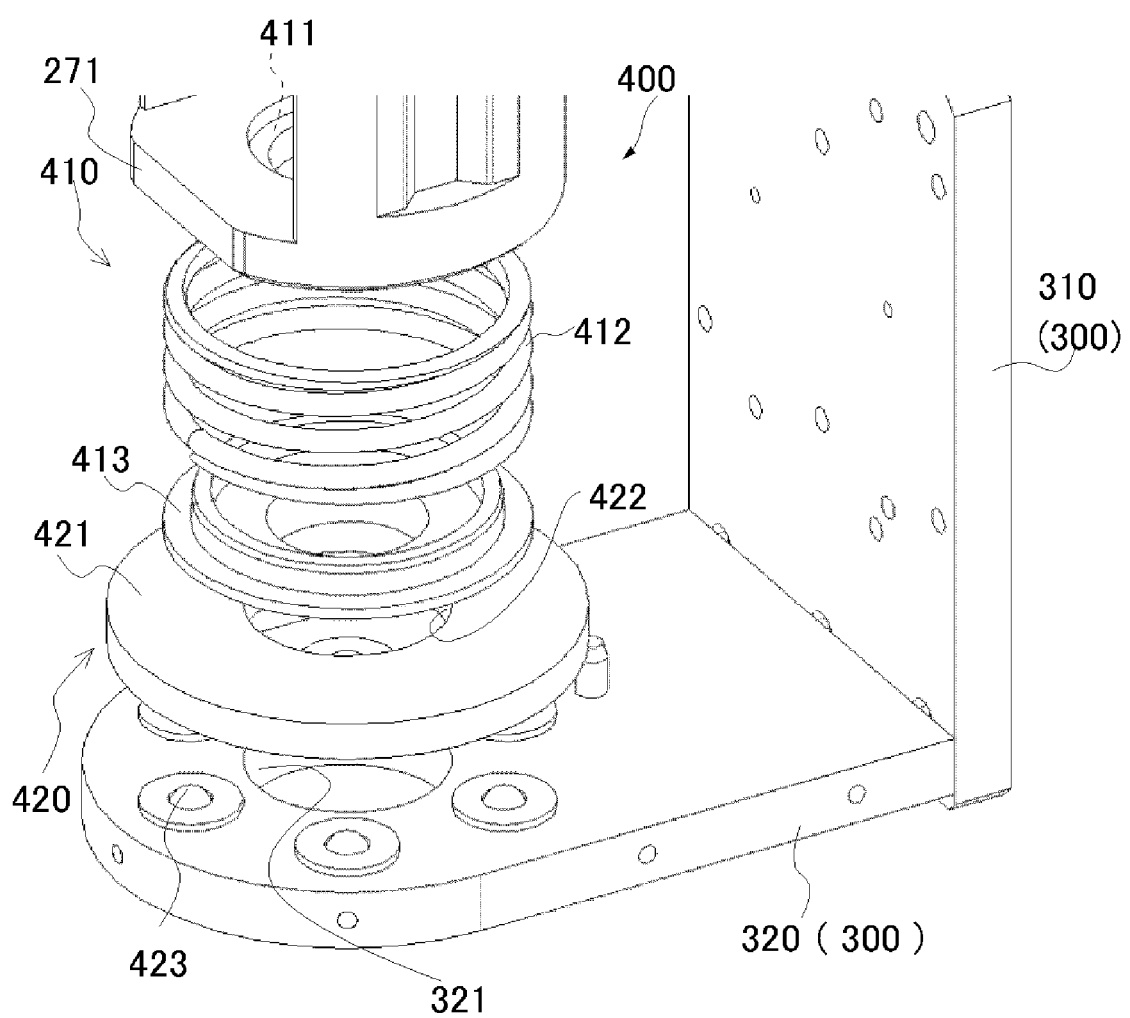
FIG. 6 is an exploded view of a floating joint part according to an first exemplary embodiment.

FIG. 6 is an exploded view of the floating joint part 400.

Figure 7:
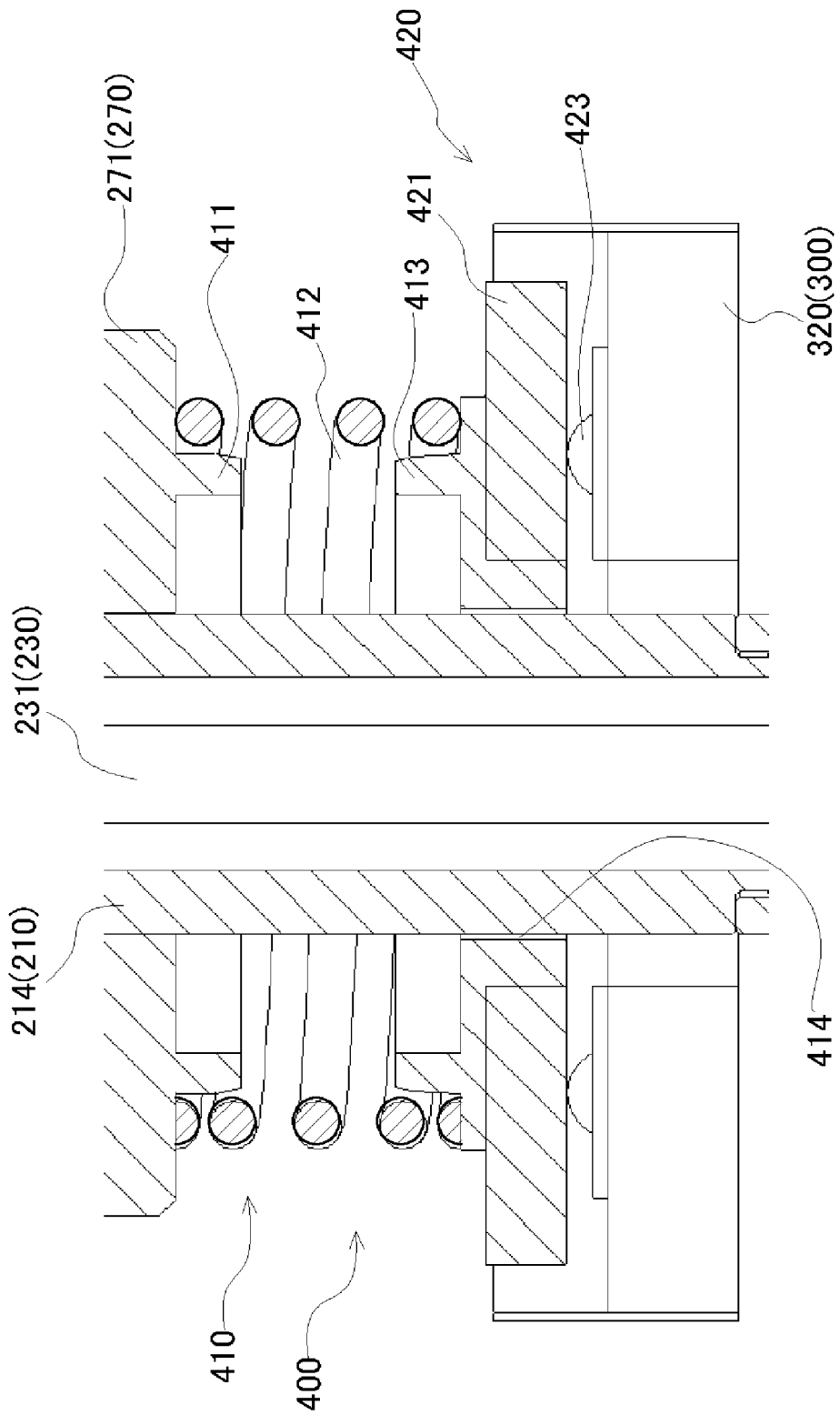
FIG. 7 is a cross-sectional view of the floating joint part according to the first exemplary embodiment.

FIG. 7 is a cross-sectional view of the floating joint part 400.

The floating joint part 400 is a joint (or coupling mechanism) that allows rotation of the electric inside-diameter measuring device 200 with respect to the support frame part 300 and also allows horizontal translation of the electric inside-diameter measuring device 200 with respect to the support frame part 300. Even if there is an axial misalignment (inclination and distortion) between the electric inside-diameter measuring device 200 and a hole to be measured, the floating joint part 400 allowing rotation and translation allows the electric inside-diameter measuring device 200 to autonomously adjust its own position and posture.

The floating joint part 400 includes a rotation-allowing mechanism part 410 and a translation-allowing mechanism part 420.

The rotation-allowing mechanism part 410 includes a first spring holder 411, a spring (coil spring) 412 (flexible body or elastic body), and a second spring holder 413. The first spring holder 411 and the second spring holder 413 are roughly ring-shaped, with a flange extending radially outward from the ring.

As shown in the cross-sectional view in FIG. 7, the first spring holder 411 is fitted externally to the outer surface of the lower cylinder case part 214 at the upper side of the lower cylinder case part 214, and the first spring holder 411 is thereby fixedly attached to the electric inside-diameter measuring device 200. Here, the lower end face of the outer case body part 271 and the first spring holder 411 are continuously integrated, and the position where the first spring holder 411 is attached to the electric inside-diameter measuring device 200 is fixedly regulated.

As one embodiment, the first spring holder 411 may be installed in such a manner that the height (position) of the first spring holder 411 corresponds to the height (position) of the center of gravity of the electric inside-diameter measuring device 200. For example, the first spring holder 411 is installed in such a manner that the height (position) of the first spring holder 411 is approximately the same as the height (position) of the center of gravity of the electric inside-diameter measuring device 200. Alternatively, the first spring holder 411 may be installed in such a manner that the height (position) of the first spring holder 411 is within 20%, 15%, 10%, or 5% (of the length of the electric inside-diameter measuring device in the vertical direction) above or below the height (position) of the center of gravity of the electric inside-diameter measuring device 200.

The upper end of the coil spring 412 is received by the first spring holder 411 while the coil spring 412 accommodates the lower cylinder case part 214 (electric inside-diameter measuring device 200) thereinside. The lower end of the coil spring 412 is received by the second spring holder 413.

As one embodiment, instead of one coil spring 412, a plurality of elastic bodies or springs may be provided to surround the electric inside-diameter measuring device 200 (at equal angular intervals).

Although it is better for the spring to have a larger diameter (for the distance between the spring and the center axis of the electric inside-diameter measuring device to be larger) to support the electric inside-diameter measuring device, if the diameter of the spring is too large (the distance between the spring and the center axis of the electric inside-diameter measuring device is too large), the measurement pressure of the inside-diameter measuring device alone cannot autonomously adjust the posture of the electric inside-diameter measuring device to scan the axis of the hole. If the diameter of the spring is to be increased (the distance between the spring and the center axis of the electric inside-diameter measuring device is to be increased), the spring constant (modulus of elasticity) should be decreased. If the diameter of the spring is to be reduced (the distance between the spring and the center axis of the electric inside-diameter measuring device is to be reduced), the spring constant (modulus of elasticity) may be slightly increased. Although the elastic spring is described in the exemplary embodiment, the member coupling the first spring holder 411 and the second spring holder 413 may be a flexible member without elasticity instead of the coil spring 412, as long as the posture adjustment in the rotational direction of the electric inside-diameter measuring device can be allowed.

The second spring holder 413 is coupled to the translation-allowing mechanism part 420.

As shown in the cross-sectional view in FIG. 7, a ring hole 414 of the second spring holder 413 has a slight length (height) in the axial direction, and the diameter of the ring hole 414 is slightly larger than the cylinder case part 210 (lower cylinder case part 214) of the electric inside-diameter measuring device 200 to the extent that it allows the inclination of the electric inside-diameter measuring device 200. The ring hole 414 may be a tapered hole 414 where the ring hole increases in diameter toward the upper side or lower side.

The translation-allowing mechanism part 420 includes a horizontal plate (translation body) 421 and a ball roller (bearing) 423.

The horizontal plate 421 is a plate provided above the support base part 320. The horizontal plate 421 includes a second insertion hole 422 through which the electric inside-diameter measuring device 200 (lower cylinder case part 214) is inserted. The second spring holder 413 is fitted into the second insertion hole 422 from above. That is, the rotation-allowing mechanism part 410 is on the horizontal plate 421, and the electric inside-diameter measuring device 200 is supported by the rotation-allowing mechanism part 410. In other words, the electric inside-diameter measuring device 200 is supported on the horizontal plate 421 with the rotation-allowing mechanism part 410 interposed.

The ball roller 423 is provided on the upper face of the support base part 320. Here, four ball rollers 423 are installed at 90-degree intervals around the first insertion hole 321 and the second insertion hole 422, and the horizontal plate 421 is placed on the ball rollers 423.

The horizontal plate 421 placed on the ball rollers 423 can move horizontally with very little force, almost without friction. On the other hand, to deform the coil spring 412 (elastic body) as the rotation-allowing mechanism part 410 requires a force to resist the elastic force. Therefore, in the present exemplary embodiment, when a force (rotational or translational force) acts on the electric inside-diameter measuring device 200, the translation-allowing mechanism part 420 relatively has priority in displacement.

The operation of adjusting the position and posture of the electric inside-diameter measuring device 200 by the action of the floating joint part 400 is described with reference to FIGS. 8 to 12.

Figure 8:
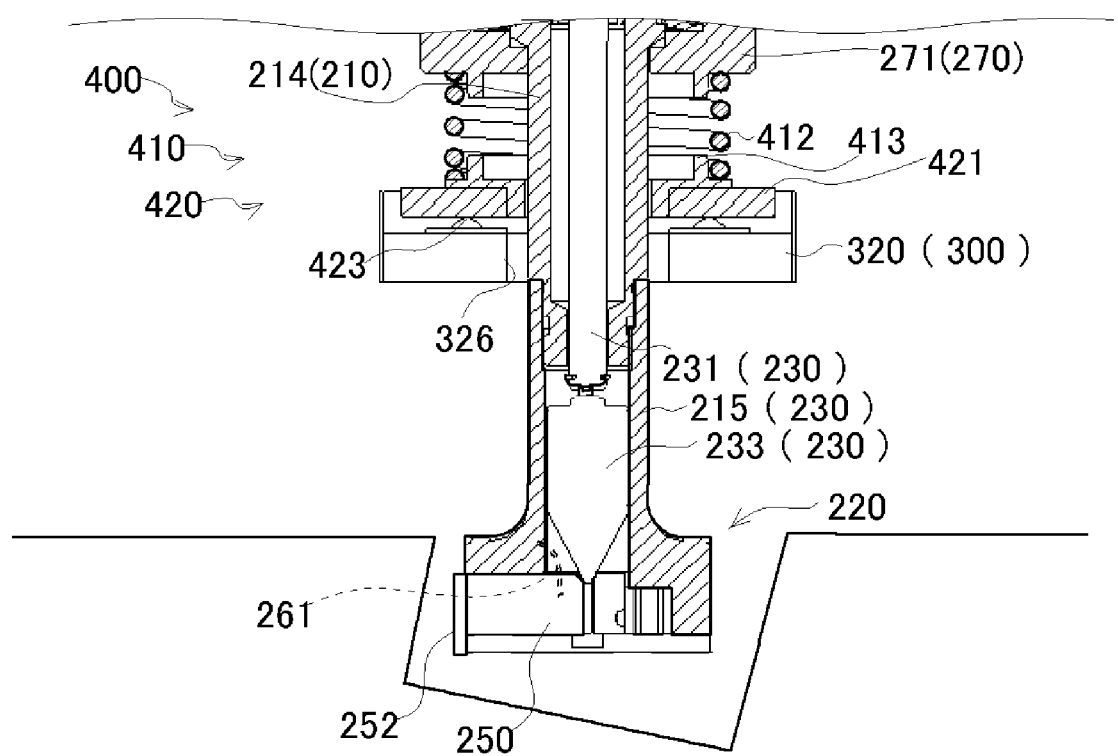
FIG. 8 is a view for explaining a function of the floating joint part for adjusting the position and posture of the electric inside-diameter measuring device according to the first exemplary embodiment.

For example, FIG. 8 shows a case assuming that a hole to be measured has been machined with a deviation from the design value and that the hole that should have been drilled vertically has an inclination and is slightly deviated from the position of the design value to the right in the drawing. The electric inside-diameter measuring unit 120 is moved to the hole by the robot arm part 130, and the measuring head part 220 is inserted into the hole. Even if the drive control of the robot arm part 130 is accurate, there is a deviation in position and angle between the axis of the electric inside-diameter measuring device 200 and the axis of the hole to be measured, because the hole to be measured is deviated from the design value.

Now, in order to accurately measure the inside diameter of a hole to be measured, all the three contact points 250 need be brought into even contact with the inside wall of the hole to be measured.

First, the electric drive unit 280 drives the rod 230 to move the rod 230 downward. Then, the tip (cone) of the lower rod 233 protrudes the contact points 250, and one of the three contact points 250 closer to the inner wall of the hole to be measured is brought into contact with the inner wall of the hole to be measured.

As the lower rod 233 continues to protrude the contact points 250, a reaction force is applied to the contact points 250 from the inside wall of the hole. This reaction force causes the electric inside-diameter measuring device 200 to be pushed in the opposite direction. The reaction force pushes near the lower end of the lower rod 233 from the contact points 250, but the displacement of the horizontal plate 421 occurs first before the deformation of the coil spring 412 of the rotation-allowing mechanism part 410. Thus, as shown in FIGS. 9 and 10, the displacement of the horizontal plate 421 first absorbs the axial misalignment between the electric inside-diameter measuring device 200 and the hole to be measured.

The first insertion hole 321 of the support base part 320 has a diameter large enough to allow horizontal movement of the electric inside-diameter measuring device 200.

Figure 9:
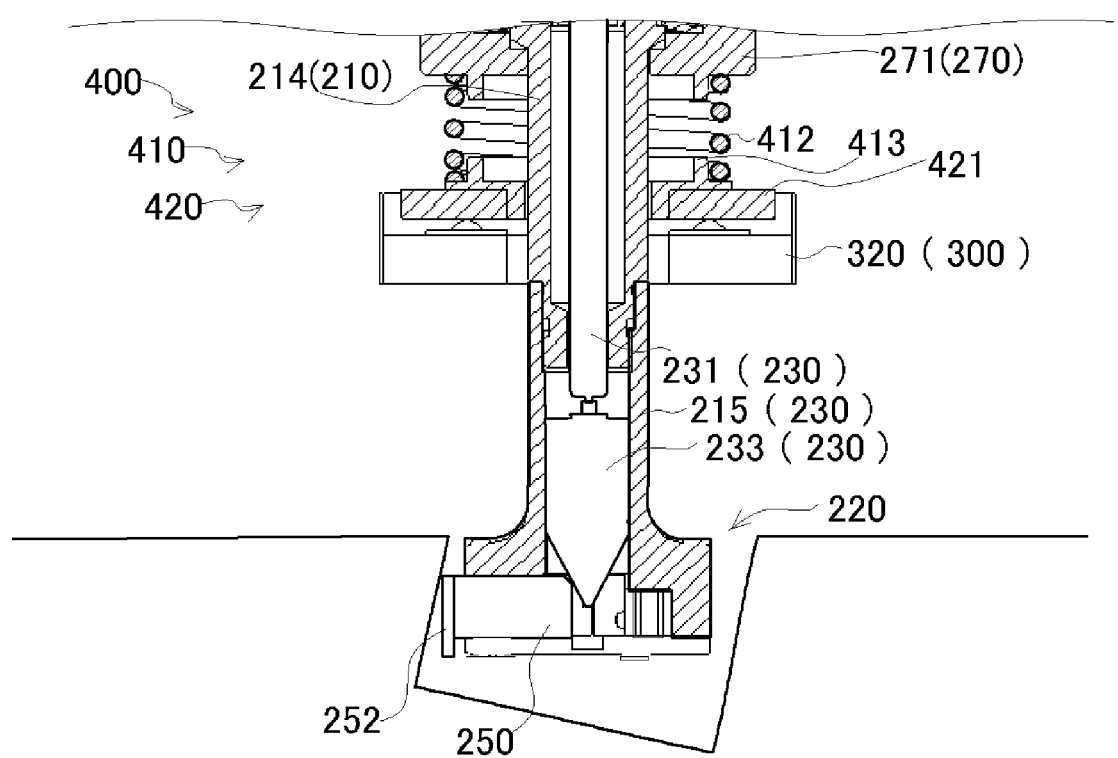
FIG. 9 is a view for explaining the function of the floating joint part for adjusting the position and posture of the electric inside-diameter measuring device according to the first exemplary embodiment.
Figure 10:
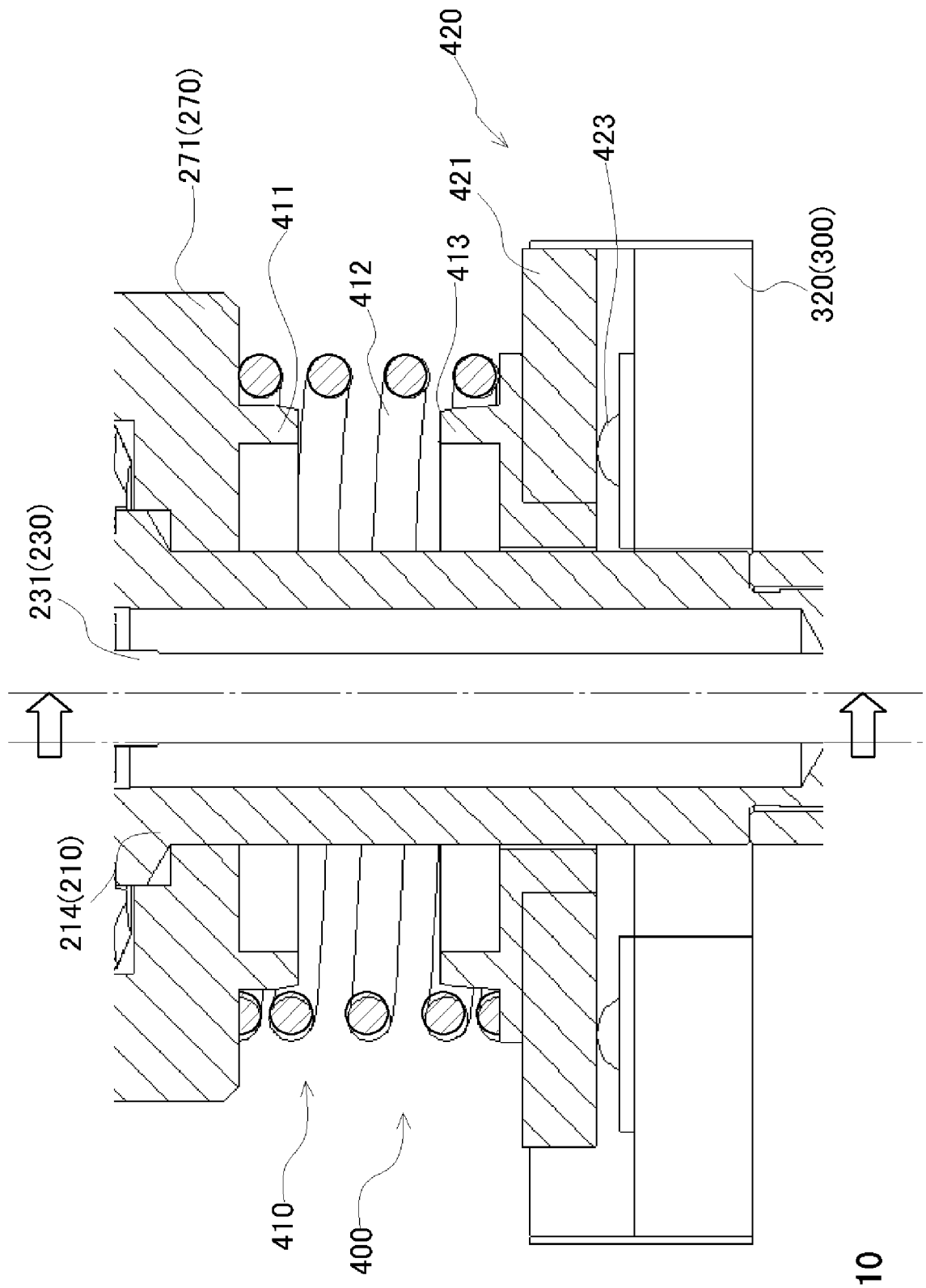
FIG. 10 is a view for explaining the function of the floating joint part for adjusting the position and posture of the electric inside-diameter measuring device according to the first exemplary embodiment.
Figure 11:
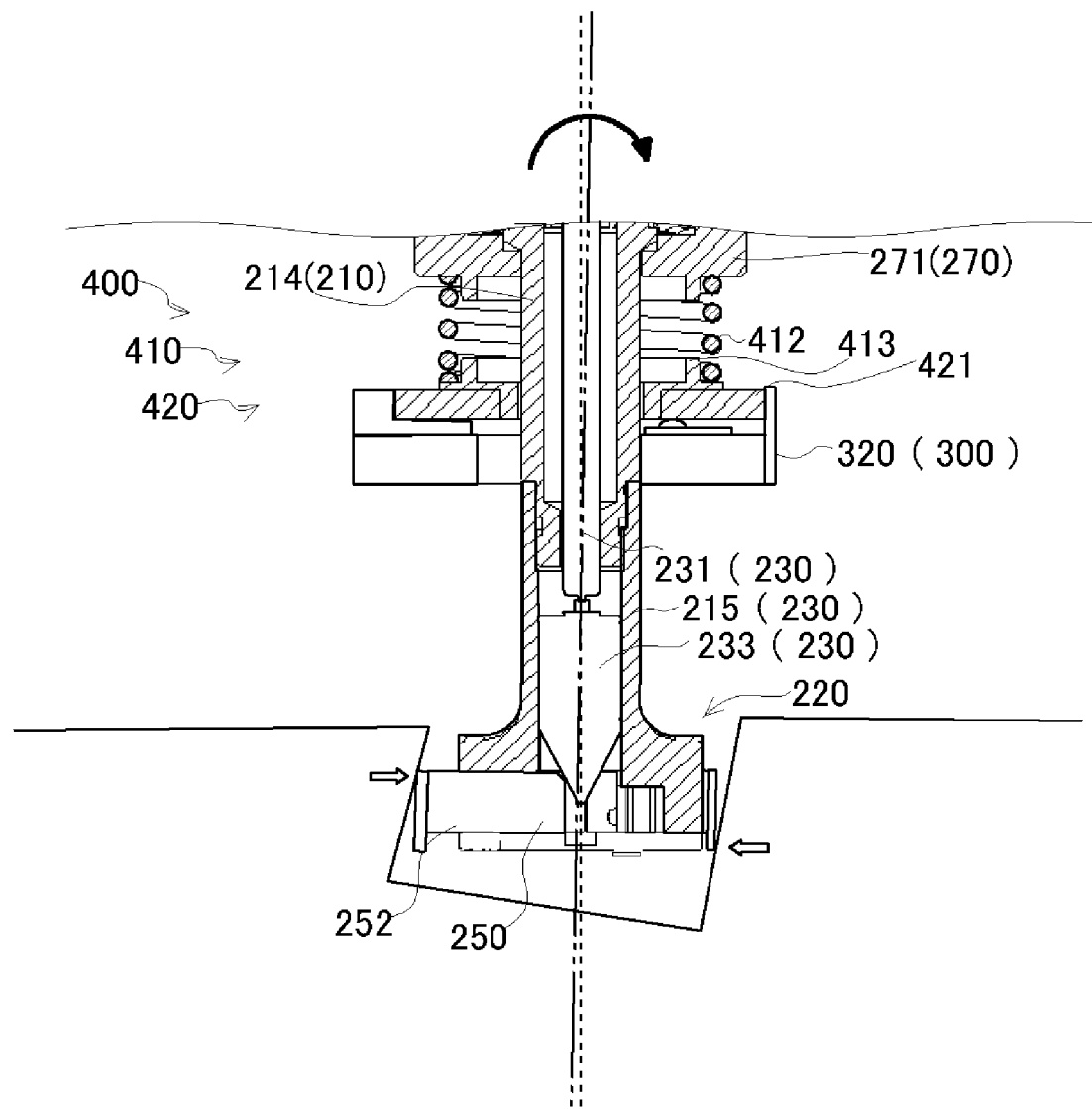
FIG. 11 is a view for explaining the function of the floating joint part for adjusting the position and posture of the electric inside-diameter measuring device according to the first exemplary embodiment.
Figure 12:
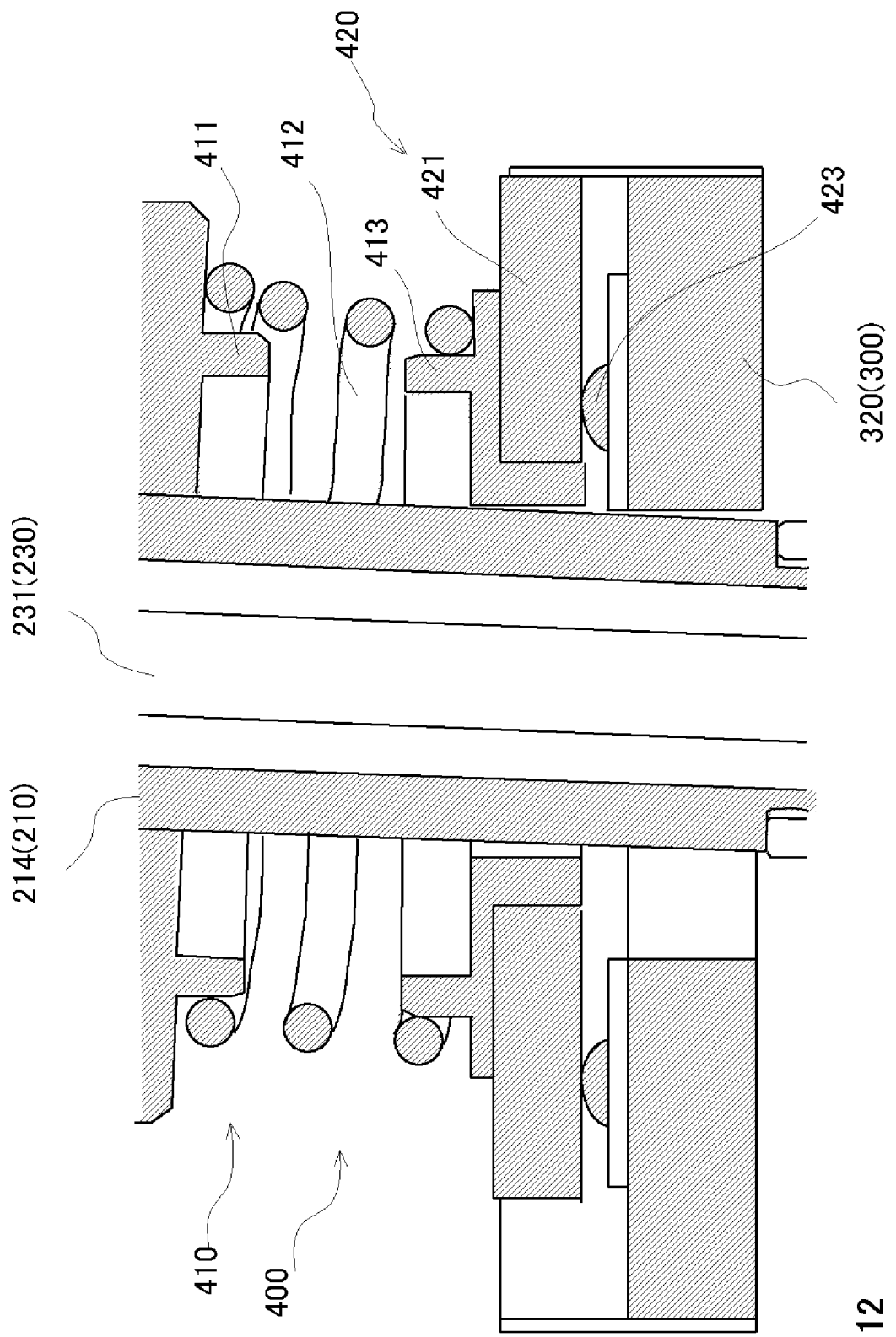
FIG. 12 is a view for explaining the function of the floating joint part for adjusting the position and posture of the electric inside-diameter measuring device according to the first exemplary embodiment.

At the time of FIG. 9 (FIG. 10), the axal inclination is not yet aligned between the electric inside-diameter measuring device 200 and the hole to be measured. When the lower rod 233 continues to protrude the contact points 250 from the state shown in FIG. 9 (FIG. 10), the tips (round shafts) of the contact points 250 are brought into contact with the inner wall of the hole, and at this time (because of the length of the three round shafts), the reaction force applied to the electric inside-diameter measuring device 200 from the inner wall of the hole to be measured has a moment of rotation. At this time, the reaction force from the inner wall of the hole deforms the coil spring 412 of the rotation-allowing mechanism part 410 as shown in FIGS. 11 and 12, and the inclination of the electric inside-diameter measuring device 200 is adjusted to align the axis of the electric inside-diameter measuring device 200 with the axis of the hole to be measured. The ring hole 414 of the second spring holder 413 allows the inclination of the electric inside-diameter measuring device 200.

Eventually, when the three contact points 250 push against the inner wall of the hole to be measured with the predetermined measuring pressure, the floating joint part 400 (the rotation-allowing mechanism part 410 and the translation-allowing mechanism part 420) allows the electric inside-diameter measuring device 200 to autonomously adjust its own position and posture to accurately measure the inside diameter of the hole to be measured. In other words, once the robot arm part 130 is able to insert the measuring head part 220 of the electric inside-diameter measuring device 200 into the hole to be measured, the inside diameter of the hole can be accurately measured through automatic posture adjustment without the need for manual sensory adjustment or advanced feedback control.

(Restriction Means 500)

The restriction means 500 is provided to the support frame part 300 (support column part 310) to hold and support the electric inside-diameter measuring device 200. The restriction means 500 includes two clamping pieces 510 that clamp the electric inside-diameter measuring device 200 from a direction perpendicular to the axis as shown, for example, in FIGS. 2 and 3. Here, the clamping pieces 510 clamp the outer case body part 271 from both sides. The clamping pieces 510 are movable, and the restriction means 500 can switch between a hold state of the electric inside-diameter measuring device 200 and a release state in which the holding is released.

Even though the clamping pieces 510 are opened to release the electric inside-diameter measuring device 200, the gap between each clamping piece 510 and the electric inside-diameter measuring device 200 is preferably limited to a predetermined upper limit (about 5 mm or 10 mm) to regulate any large displacement (translation or inclination) of the electric inside-diameter measuring device 200 beyond the limit.

The electric inside-diameter measuring device 200 is placed on the support base part 320 (support frame part 300) via the floating joint part 400.

In order for the electric inside-diameter measuring device 200 to be able to autonomously adjust its posture according to a hole to be measured with its own measuring pressure, the floating joint part 900 needs to be soft (softness or flexibility). Therefore, if the electric inside-diameter measuring device 200 is simply placed on the floating joint part 400, the electric inside-diameter measuring device 200 can swing unsteadily, be inclined greatly, or fall down, depending on the rigidity (softness) of the floating joint part 400.

From a safety point of view, it is undesirable that the electric inside-diameter measuring device 200 swings or falls down. In addition, if the posture of the electric inside-diameter measuring device 200 is not fixed, the position of the measuring head part 220 is unstable, and the robot arm part 130 cannot be able to insert the measuring head part 220 of the electric inside-diameter measuring device 200 into the hole to be measured.

For these reasons, when the electric inside-diameter measuring device 200 is not inserted in a hole to be measured, the restriction means 500 clamps and holds the electric inside-diameter measuring device 200. Then, when the measuring head part 220 of the electric inside-diameter measuring device 200 is inserted in a hole to be measured, the restriction means 500 releases the electric inside-diameter measuring device 200 in order for the electric inside-diameter measuring device 200 to be able to autonomously change and adjust its posture (to perform autonomous adjustment) by the floating joint part 400.

(Collision Detection Part 600)

The collision detection part 600 detects that the electric inside-diameter measuring device 200 has collided with something with a force greater than a predetermined force.

Figure 13:
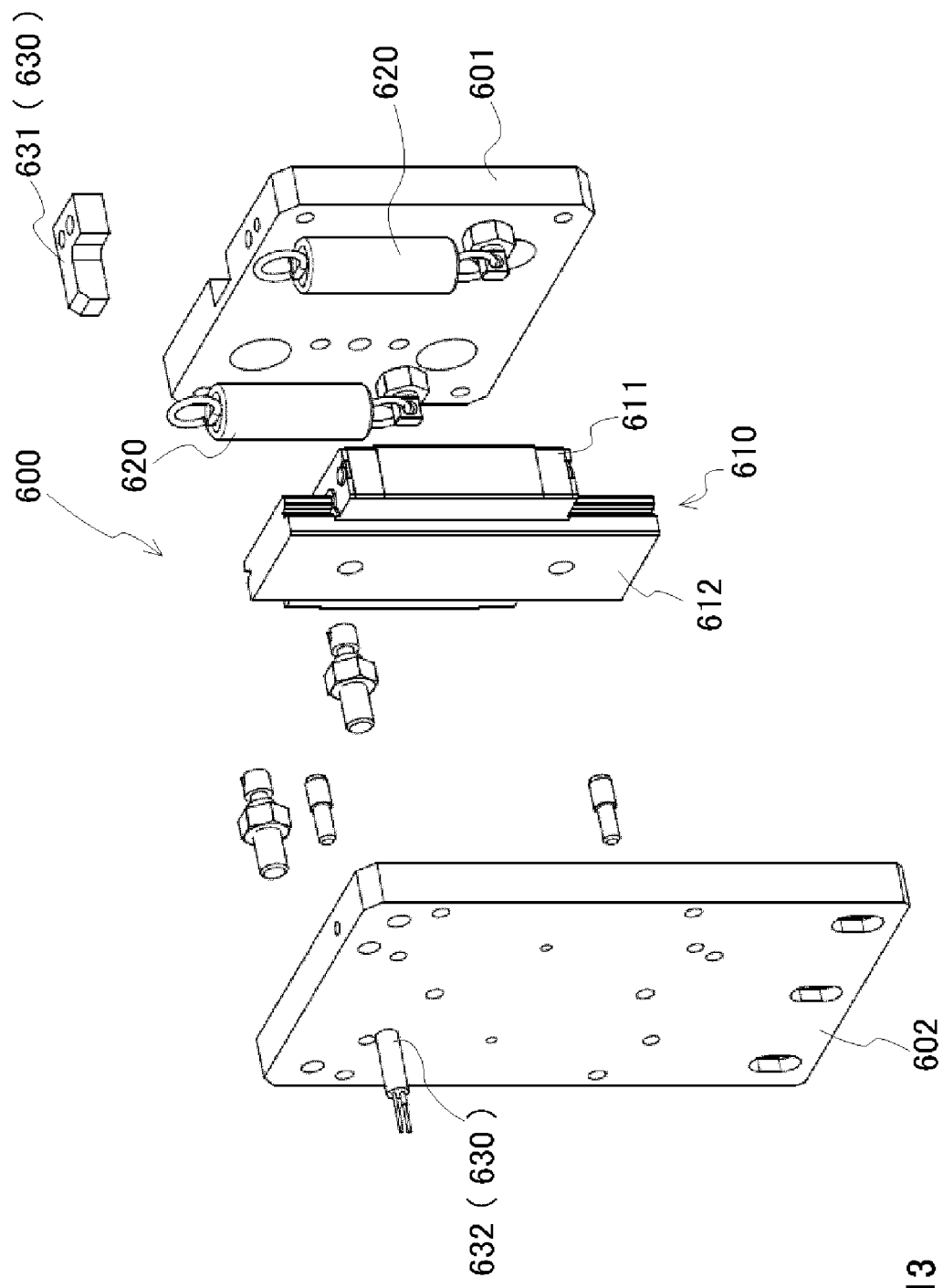
FIG. 13 is an exploded view of a collision detection part.

FIG. 13 is an exploded view of the collision detection part.

Figure 14:
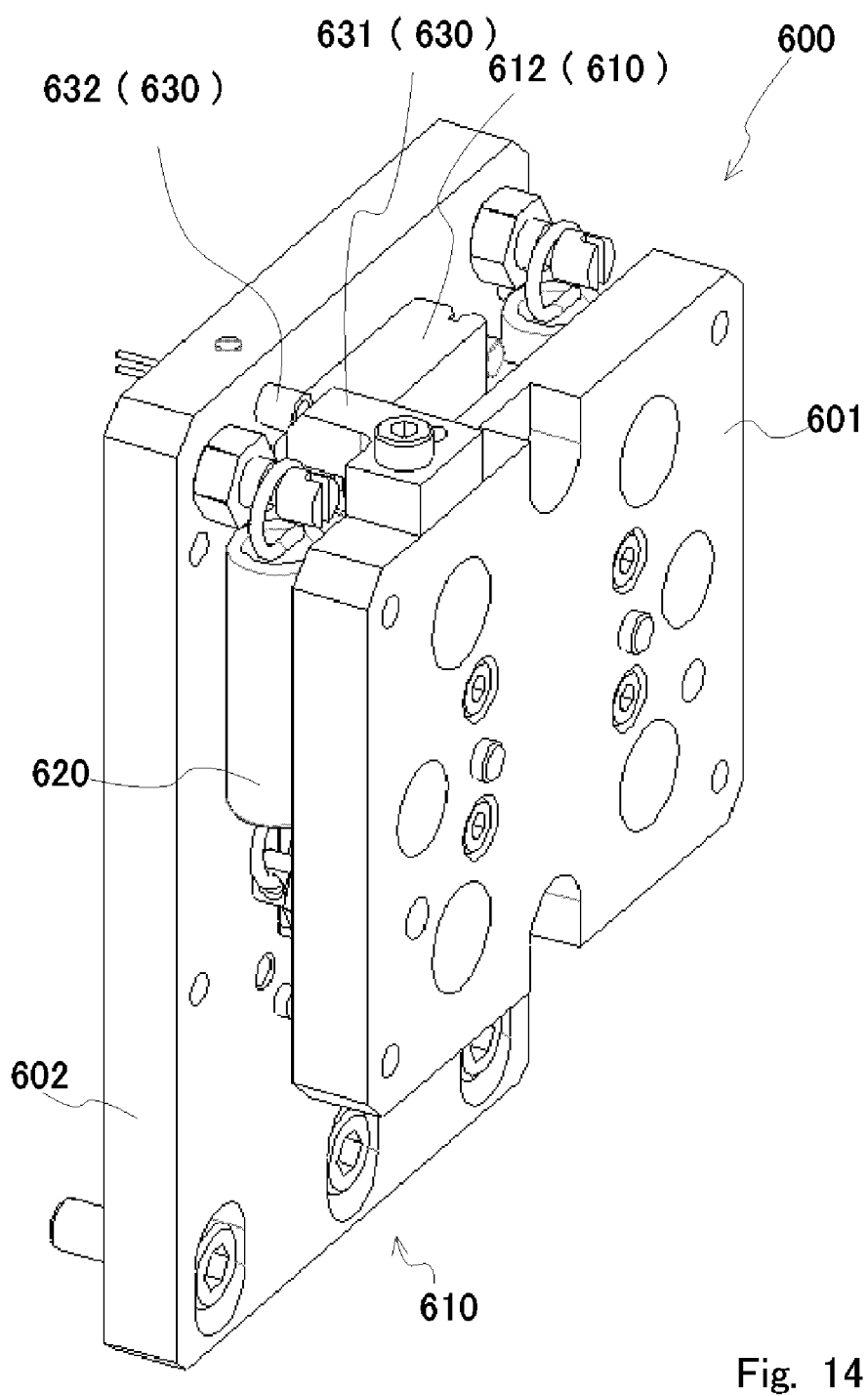
FIG. 14 is a perspective view of the collision detection part when viewed from a slightly rear side.

FIG. 14 is a perspective view of the collision detection part when viewed from a slightly rear side.

The collision detection part 600 is provided between the rear side of the support column part 310 and the hand part 131 of the robot arm part 130. Here, the collision detection part 600 detects that a large force is applied to the electric inside-diameter measuring device 200 in the direction of being pushed upward from below in the Z direction (vertical direction) when the electric inside-diameter measuring device 200 approaches an object (for example, a workpiece) from above the object and collides with the workpiece. That is, the collision detection direction of the collision detection part 600 is almost parallel to the direction when the electric inside-diameter measuring device 200 approaches a hole to be measured.

The collision detection part 600 includes a fixed plate 601, a mounting plate 602, a linear guide 610, a biasing means 620, and a contact sensor 630.

The fixed plate 601 is attached directly or indirectly to the hand part 131 of the robot and is fixedly provided to the hand part 131. Here, the force sensor part 132 is provided between the hand part 131 of the robot and the collision detection part 600. Therefore, the collision detection part 600 is attached to the hand part 131 of the robot arm part 130 via the force sensor part 132.

The mounting plate 602 is attached directly or indirectly to the rear face of the support column part 310 and is fixedly provided to the support column part 310 (support frame part 300). The linear guide 610 is provided between the fixed plate 601 and the mounting plate 602 and guides the moving direction of the mounting plate 602 with respect to the fixed plate 601 in the vertical direction. The linear guide 610 includes a groove frame body 611 having a groove in the vertical direction and a slide body 612 that slides in the groove of the groove frame body 611 in the vertical direction. Here, the groove frame body 611 is attached to the fixed plate 601, and the slide body 612 is attached to the mounting plate 602.

The biasing means is two coil springs 620.

One end of each coil spring 620 is fastened to the fixed plate 601, and the other end of the coil spring 620 is fastened to the mounting plate 602. Each coil spring 620 constantly biases the mounting plate 602 in the direction of pulling down the mounting plate 602 with respect to the fixed plate 601. That is, the position of the mounting plate 602 when the mounting plate 602 is lowered vertically downward with respect to the fixed plate 601 by its own weight, the weight of the electric inside-diameter measuring device 200, and the force of the coil spring 620 is a reference position.

The contact sensor 630 includes a contact detection block 631 provided to the fixed plate 601 and a ball plunger 632 provided to the mounting plate 602. As shown in FIG. 14, when the mounting plate 602 is in the reference position with respect to the fixed plate 601, the ball plunger 632 on the mounting plate 602 is in contact with (fitting into) the contact detection block 631.

Here, it is assumed that, for example, the position of a hole machined in a workpiece is deviated significantly from the design value.

In this state, when the robot arm part 130 attempts to insert the electric inside-diameter measuring device 200 into the hole to be measured from above, the measuring head part 220 of the electric inside-diameter measuring device 200 hits the workpiece. The electric inside-diameter measuring device 200 (measuring head part 220) is deviated from the hole and hits the workpiece, and the electric inside-diameter measuring device 200 (measuring head part 220) is pushed further into the workpiece. Then, when a force exceeding the gravitational force of the electric inside-diameter measuring device 200 and the biasing force of the biasing means (coil spring 620) are applied to the collision detection part 600, the mounting plate 602 slides upward and the ball plunger 632 of the mounting plate 602 is removed from the contact detection block 631. The contact sensor 630 transmits a signal (collision detection signal) when the contact detection block 631 detects the separation of the ball plunger 632 (or when the contact detection block 631 can no longer detect the contact of the ball plunger 632).

When the collision detection part 600 detects that the electric inside-diameter measuring device 200 has collided with something, the control unit 140 immediately stops the operation of the robot arm part 130.

(Force Sensor Part 132)

The force sensor part 132 is, for example, a 6-axis (forces in 3 orthogonal axial directions and rotational forces around the axes) force sensor. While the collision detection part 600 is specialized to detect a force pushed up from below in the vertical direction (Z-direction), the force sensor part 132 detects forces applied to the electric inside-diameter measuring device 200 in all directions.

The multi-joint robot arm part 130 is what is called a robot arm and moves the hand part 131, which is the tip of the robot arm part 130, three-dimensionally with the vertical and horizontal rotational drive axes. The hand part 131 of the robot arm part 130 is coupled to the support frame part 300 via the force sensor part 132 and the collision detection part 600. The force sensor part 132 detects that the electric inside-diameter measuring device 200 has collided with an object with an unexpected force exceeding a predetermined force in directions where the collision detection part 600 does not detect collisions (that is, in directions other than the vertical direction (Z direction)). When the force sensor part 132 detects an unexpected collision of the electric inside-diameter measuring device 200, the control unit 140 immediately stops the operation of the robot arm part 130. This further ensures safety.

(Control Unit 140)

Figure 15:
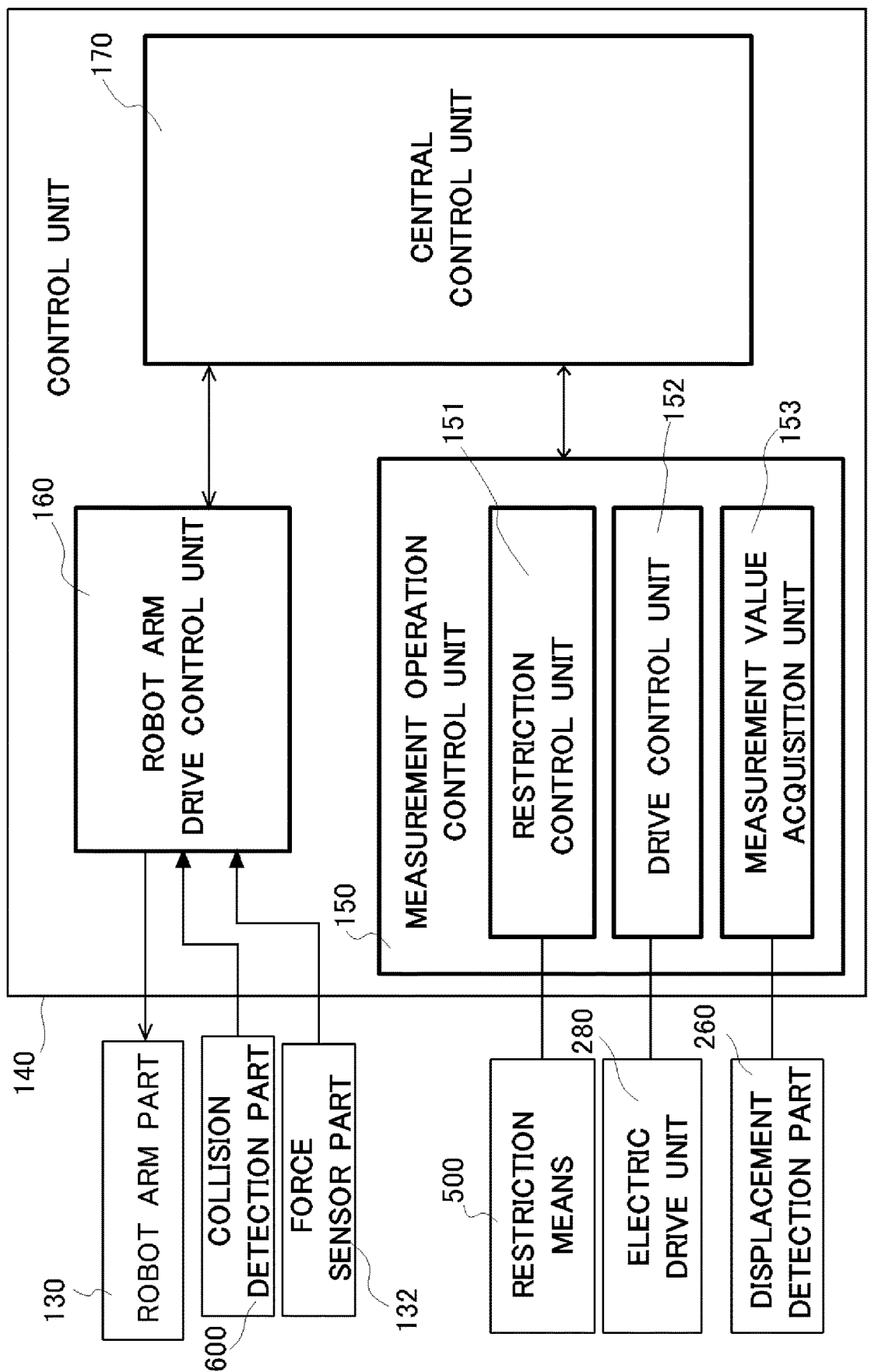
FIG. 15 is a functional block diagram of a control unit.

FIG. 15 is a functional block diagram of the control unit 140. The control unit 140 may be implemented by hardware or software incorporated into a computer (a computer terminal including a central processing unit (CPU), a ROM or a RAM storing predetermined programs) that is connected to the measuring-apparatus main body 110 by wired or wireless communication.

An operation control program (measuring part program) is installed in the computer terminal, and the measurement operation of the measuring-apparatus main body 110 is controlled by executing the program. The method of supplying the program is not limited. The program may be installed by inserting a (nonvolatile) recording medium recording the program directly into the computer, or a reading device that reads the information on the recording medium may be attached externally to the computer to install the program into the computer from the reading device. Alternatively, the program may be supplied to the computer via a communication line, such as the Internet, a LAN cable, or a telephone line, or wirelessly.

The control unit 140 includes a measurement operation control unit 150, a robot arm drive control unit 160, and a central control unit 170.

The measurement operation control unit 150 controls the measurement operation of the electric inside-diameter measuring device 200.

The measurement operation control unit 150 includes a restriction control unit 151, a drive control unit 152, and a measurement value acquisition unit 153.

The restriction control unit 151 controls the opening and closing operation of the clamping pieces 510 of the restriction means 500 to control the timing of holding and releasing of the electric inside-diameter measuring device 200.

The drive control unit 152 controls the drive of the electric drive unit 280 to control the forward and backward movement of the rod 230, that is, the forward and backward movement of the contact points 250.

The measurement value acquisition unit 153 acquires a measurement value of the electric inside-diameter measuring device 200. That is, the measurement value acquisition unit 153 receives a sensor value of the displacement detection part 260 to acquire the measurement value of the inside diameter of a hole to be measured from the displacement (position) of the rod 230.

The robot arm drive control unit 160 controls the operation of the robot arm part 130.

The central control unit 170 integrally controls the measurement operation control unit 150 and the robot arm drive control unit 160.

(Operation of Controlling Automatic Inside-Diameter Measuring Apparatus 100)

The following describes a series of operations in which the measuring-apparatus main body 110 (the electric inside-diameter measuring unit 120 and the robot arm part 130) automatically measures the inside diameter of a hole to be measured under the control of the control unit 140.

Figure 16:
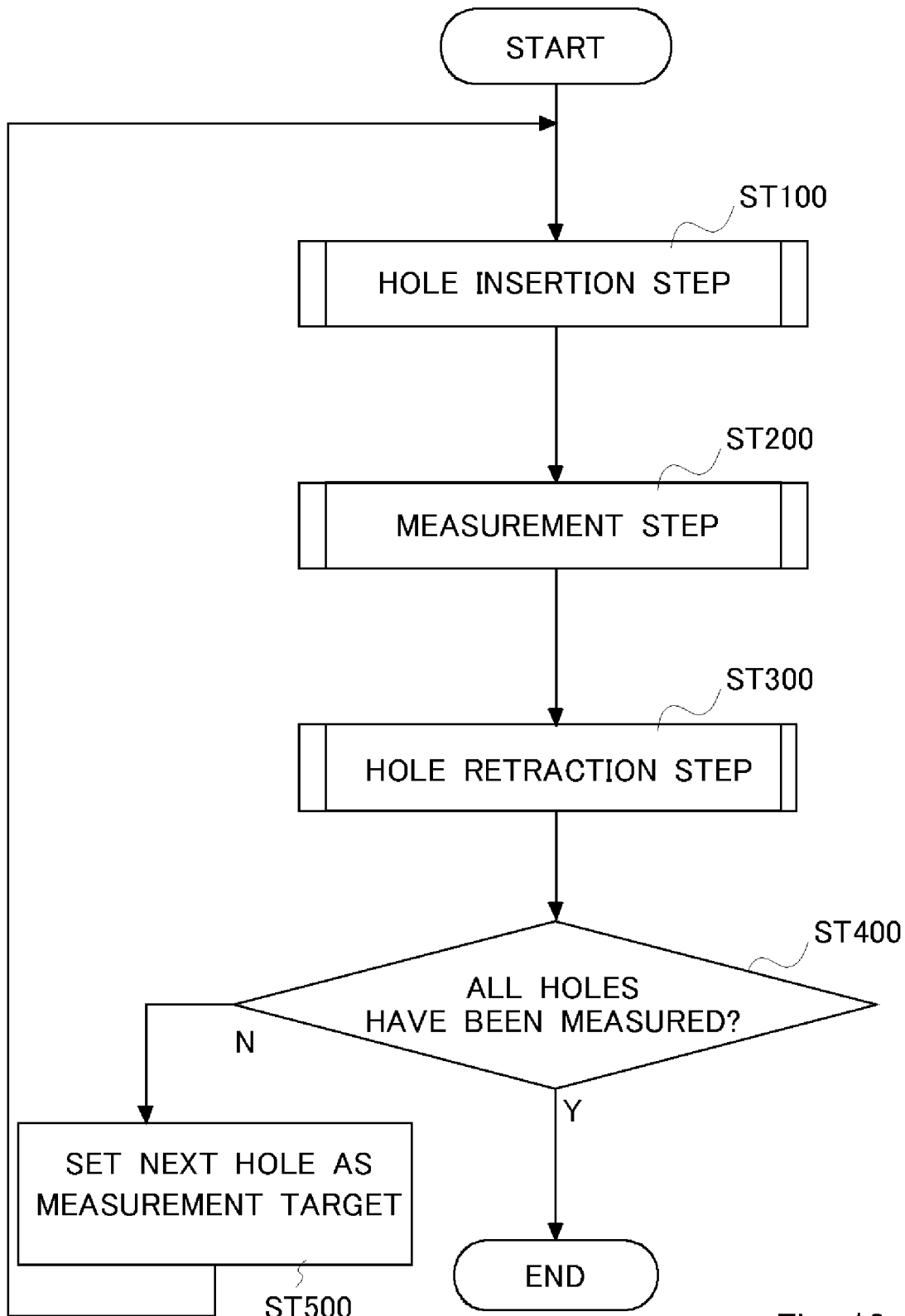
FIG. 16 is a flowchart of the overall operation of automatic inside-diameter measurement.

FIG. 16 is a flowchart of the overall operation of automatic inside-diameter measurement (automatic inside-diameter measurement operation).

A workpiece (object to be measured) having a hole (hole to be measured) is conveyed by a conveyor belt or rail in a production line and brought to a predetermined position in front of the measuring-apparatus main body 110 (the electric inside-diameter measuring unit 120 and the robot arm part 130).

The automatic inside-diameter measuring apparatus 100 automatically sequentially performs inside-diameter measurement on the inside diameters of holes that are designated (set) as objects to be measured among workpieces (objects to be measured) to be conveyed. The position (coordinates) of a hole to be measured among the workpieces (objects to be measured) has been set (stored) as part of the measuring part program in the central control unit 170. Alternatively, the inside-diameter measurement may be performed automatically sequentially while searching for a hole to be measured by image recognition using a separate camera or the like.

The first exemplary embodiment assumes that a hole to be measured is a hole drilled to have an opening on the top face in the vertical direction, and the electric inside-diameter measuring device 200 is inserted into the hole from above while maintaining a roughly vertical orientation.

The automatic inside-diameter measurement operation includes a hole insertion step (approaching step) (ST100), a measurement step (ST200), and a hole retraction step (retraction step) (ST300).

The hole insertion step (ST100) is a step of moving the electric inside-diameter measuring unit 120 by the robot arm part 130 and inserting the measuring head part 220 of the electric inside-diameter measuring device 200 into a hole to be measured (in other words, approaching a workpiece from above the workpiece).

Figure 17:
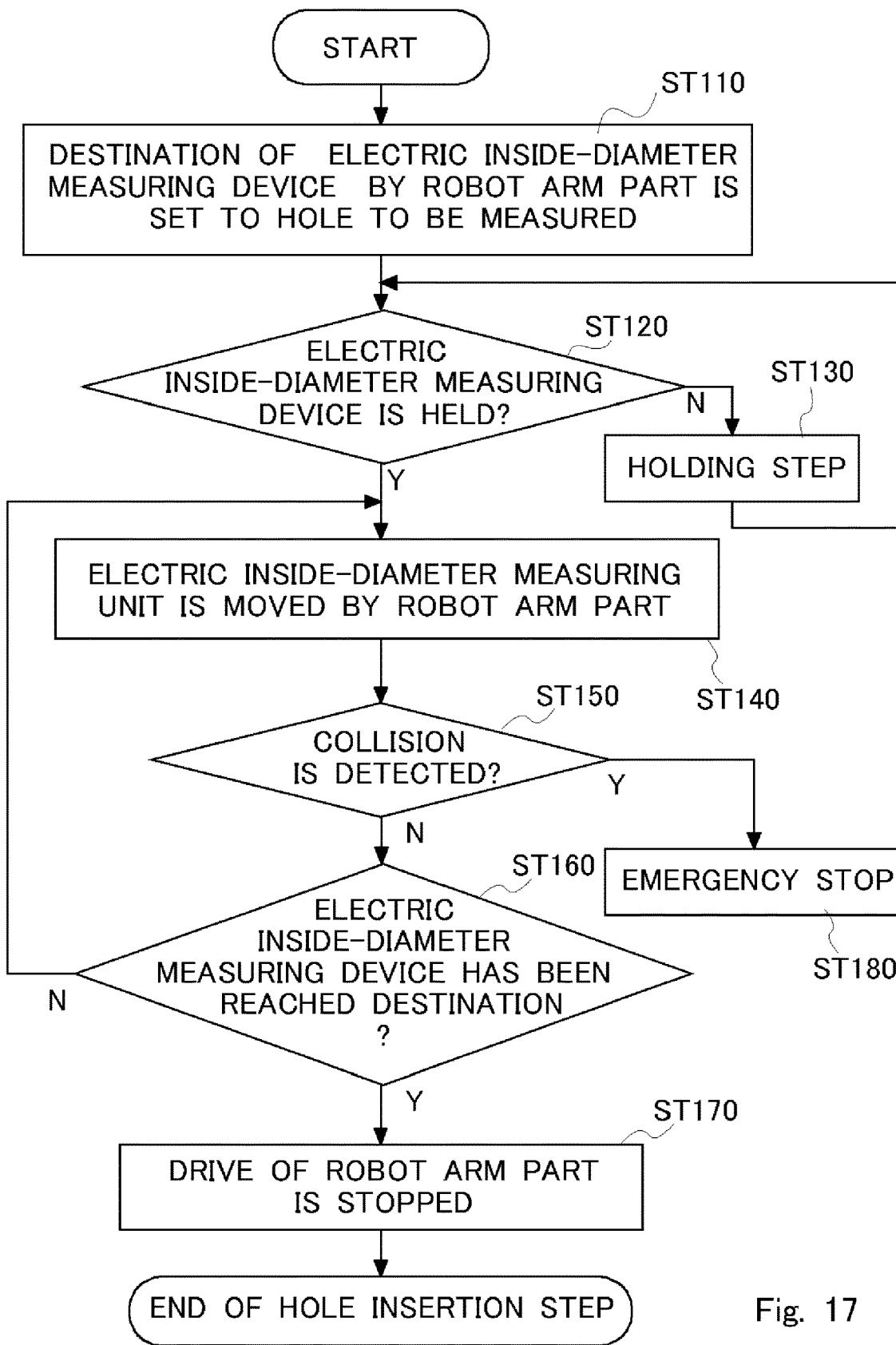
FIG. 17 is a flowchart showing an operating procedure of a hole insertion step (ST100)

FIG. 17 is a flowchart showing an operating procedure of the hole insertion step (ST100).

In the hole insertion step (ST100), first, the destination (target coordinates) of the electric inside-diameter measuring device 200 by the robot arm part 130 is set to the hole to be measured (ST110).

Then, it is confirmed that the electric inside-diameter measuring device 200 is restricted by the restriction means 500 (ST120).

In the present exemplary embodiment, the state in which the restriction means 500 restricts (holds) the electric inside-diameter measuring device 200 is a default state (which may be paraphrased as a standard state or a reference state). However, since the holding by the restriction means 500 can be released after the electric inside-diameter measuring device 200 is maintained or replaced, the holding state needs to be confirmed. Then, when the electric inside-diameter measuring device 200 is not held (ST120: NO), the restriction control unit 151 transmits a signal to perform a holding step (ST130) by the restriction means 500. By restricting (holding) the electric inside-diameter measuring device 200 while the robot arm part 130 moves the electric inside-diameter measuring unit 120, the robot arm part 130 can stably safely move the electric inside-diameter measuring device 200.

The drive of the robot arm part 130 is started (ST140) to move the electric inside-diameter measuring unit 120, and the measuring head part 220 of the electric inside-diameter measuring device 200 is inserted into the hole to be measured.

At this time, for example, if the machining position of the hole to be measured is deviated from the design value, the electric inside-diameter measuring device 200 (measuring head part 220) can unexpectedly collide with the workpiece.

In this regard, the robot arm drive control unit 160 monitors signals from the collision detection part 600 and the force sensor part 132 (ST150). If a collision between the electric inside-diameter measuring device 200 (measuring head part 200) and the workpiece is detected (ST150: YES), the drive of the robot arm part 130 is immediately stopped (emergency stop) (ST180). Thereafter, the central control unit 170 may report the abnormality to an operator.

When the measuring head part 220 of the electric inside-diameter measuring device 200 is inserted into the hole to be measured and reaches the target coordinates, the drive of the robot arm part 130 is temporarily stopped (ST170).

Next, the procedure proceeds to the measurement step (ST200).

Figure 18:
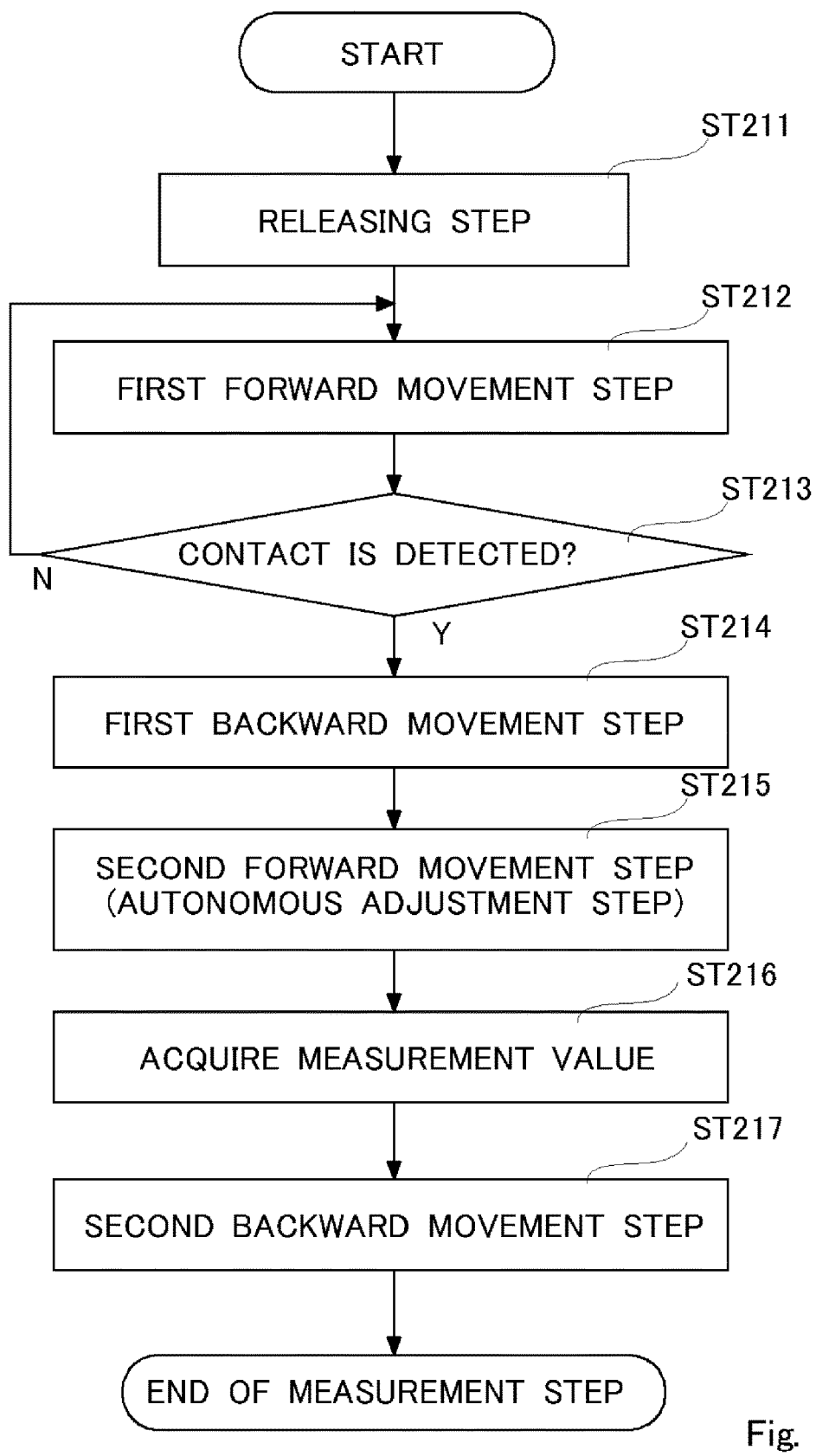
FIG. 18 is a flowchart showing an operating procedure of a measurement step (ST200)

FIG. 18 is a flowchart showing an operating procedure of the measurement step (ST200).

In the measurement step (ST200), first, the holding by the restriction means 500 is released (ST211) to put the electric inside-diameter measuring device 200 in a released state. This makes the electric inside-diameter measuring device 200 in a state of being supported by the support frame part 300 via the floating joint part 400, allowing autonomous adjustment of the position and posture of the electric inside-diameter measuring device 200.

Then, the drive control unit 152 transmits a drive signal to drive the electric drive unit 280.

First, a first forward movement step (ST220) is performed. The first forward movement step (ST220) is a step of moving the contact points 250 forward until the contact points 250 are brought into first contact with the inner wall of the hole to be measured. The electric drive unit 280 (for example, a motor) is driven to move the rod 230 forward (in this case, downward) to move the contact points 250 forward toward the inner wall of the hole. In the first forward movement step (ST220), the motor is driven at high speed to move the rod 230 and the contact points 250 as fast as possible to improve measurement efficiency. (For example, if the rod 230 is a screw feed, the rotational speed of the rod 230 is 100 rpm to 200 rpm. In terms of the speed at which the rod 230 or the contact points 250 move, the speed may be 10 μm/s to 20 μm/s.)

As the contact points 250 move forward toward the inner wall of the hole, the contact points 250 are brought into contact with the inner wall of the hole.

Here, in the present exemplary embodiment, the number of contact points 250 is three. If the axis of the electric inside-diameter measuring device 200 and the axis of the hole to be measured are perfectly aligned, the three contact points 250 can be brought into contact with the inner wall of the hole at the same time, but there is a gap between the axis of the electric inside-diameter measuring device 200 and the axis of the hole to be measured because of the driving error of the robot arm part 130 and the machining error of the workpiece. In this case, any one of the three contact points 250 is brought into first contact with the inner wall of the hole. When any one of the three contact points 250 has been brought into contact with the inner wall of the hole (ST213: YES), the first forward movement step (ST212) is immediately stopped, and the procedure proceeds to a first backward movement step (ST214). The fact that the contact points 250 have been brought into contact with the inner wall of the hole may be confirmed by, for example, calculating the motor torque from the applied current (applied voltage) of the motor to determine that (one of) the contact points (has) have brought into contact with the inner wall of the hole when the torque exceeds a predetermined value.

In the first backward movement step (ST214), the rod 230 and the contact points 250 are moved backward slightly in the opposite direction. This avoids the contact points 250 from digging into the inner wall of the hole due to its momentum after the contact points 250 have been brought into contact with the inner wall of the hole in the first forward movement step (ST212).

The distance for moving the contact points 250 backward in the first backward movement step (ST214) is very small, for example, 0.001 mm to 0.01 mm.

The speed of backward movement of the contact points 250 in the first backward movement step (ST214) may be as fast as possible. For example, if the rod 230 is a screw feed, the rotational speed of the rod 230 is 100 rpm to 200 rpm.

In terms of the speed at which the rod 230 or the contact points 250 move, the speed may be 10 µm/s to 20 µm/s.

After the contact points 250 are moved backward slightly in the first backward movement step (ST214), the contact points 250 are moved forward again in a second forward movement step (ST215). In the second forward movement step (ST215), the contact points 250 are moved forward slowly (at a low speed with fine movement).

The feed speed of the contact points 250 in the second forward movement step (ST215) is preferably slow (micromotion). For example, if the rod 230 is a screw feed, the rotational speed of the rod 230 is 10 rpm to 20 rpm. In terms of the speed at which the rod 230 or the contact points 250 move, the speed may be 1 µm/s to 2 µm/s.

The position and inclination of the electric inside-diameter measuring device 200 are autonomously adjusted by the reaction force of the contact points 250 pushing against the inner wall of the hole. The action of the autonomous adjustment of the position and inclination of the electric inside-diameter measuring device 200 by the floating joint part 400 allowing translation and rotation is as described above.

When the three contact points 250 are in even contact with the inner wall of the hole with the predetermined measuring pressure, the autonomous adjustment of the position and inclination of the electric inside-diameter measuring device 200 is completed. When the three contact points 250 are in contact with the inner wall of the hole with the predetermined measuring pressure, the ratchet mechanism (constant pressure mechanism) is activated. That is, the electric drive unit 280 rotates and drives the thimble part 240 (ratchet sleeve 242) until the ratchet mechanism (constant pressure mechanism) is activated, which causes the contact points 250 to be in even contact with the inner wall of the hole with the predetermined measuring pressure.

The second forward movement step (ST215) can be rephrased as an autonomous adjustment step.

In this state, the displacement detection part 260 detects the displacement (position) of the rod 230. The measurement value acquisition unit 153 acquires the inside diameter of the hole from the displacement (position) of the rod 230 (ST216).

After the measurement value is acquired, the contact points 250 are moved backward in a second backward movement step (ST217) to separate the contact points 250 from the inner wall of the hole.

After the measurement step (ST200), the electric inside-diameter measuring device 200 is retracted from the hole to be measured in the hole retraction step (ST300).

Figure 19:
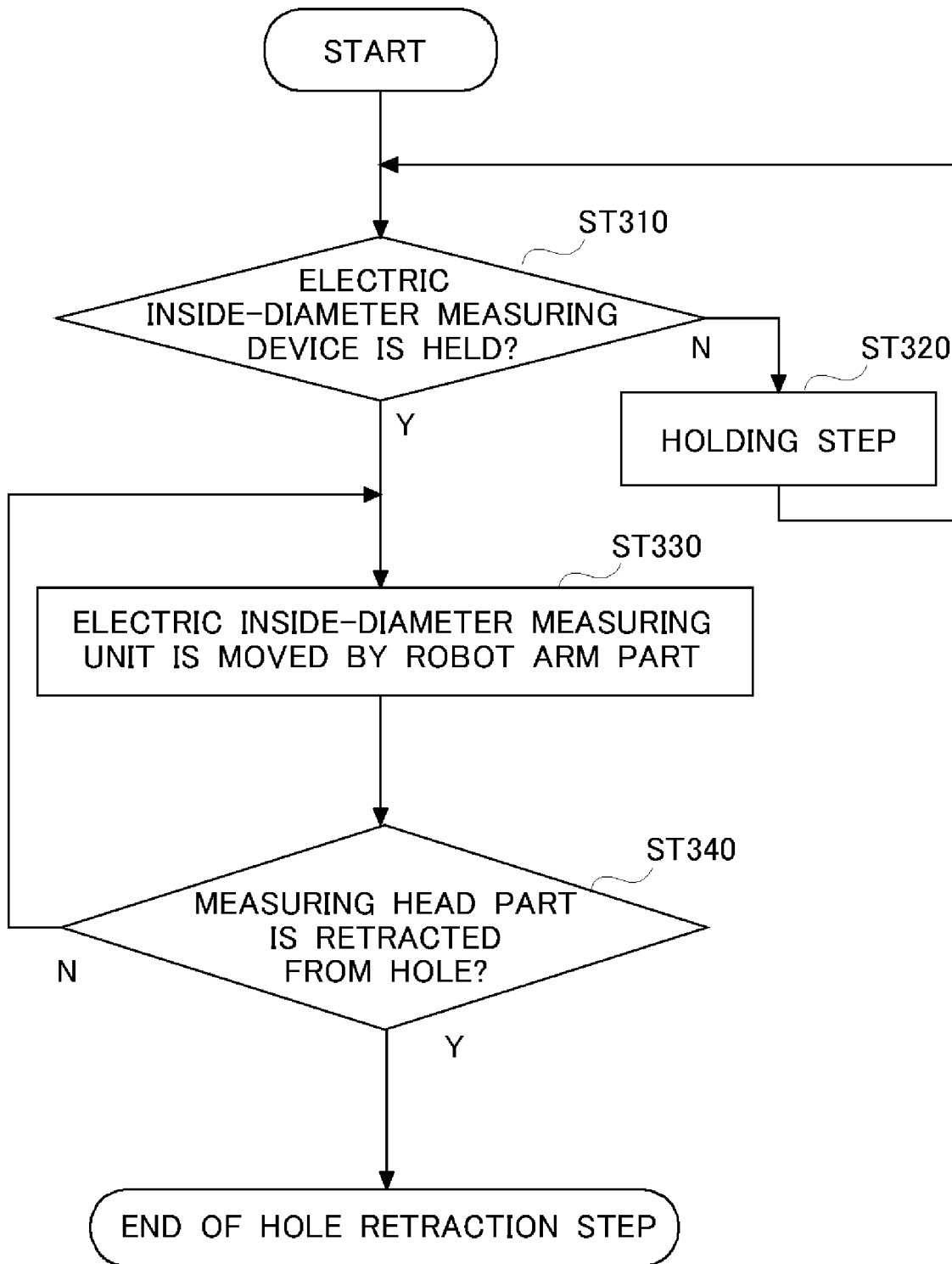
FIG. 19 is a flowchart showing an operating procedure of a hole retraction step (ST300)

FIG. 19 is a flowchart showing an operation procedure of the hole retraction step (ST300). In the hole retraction step (ST300), first, the electric inside-diameter measuring device 200 is restricted (held) by the restriction means 500 (ST320), and then the robot arm part 130 moves the electric inside-diameter measuring unit 120 to be retracted from the hole (ST330).

This completes the measurement of the inside diameter of one hole. Until measurement of all the holes to be measured is completed, ST100 to ST300 are repeated (ST400).

In this manner, according to the present exemplary embodiment, the inside diameter of a hole can be automatically measured by the electric inside-diameter measuring unit (electric inside-diameter measuring device 200 and the robot arm part 130) without the need for a person to hold and operate the inside-diameter measuring device.

Second Exemplary Embodiment

The above first exemplary embodiment assumes that a hole to be measured is drilled in the vertical direction.

A second exemplary embodiment describes a case in which the automatic inside-diameter measuring apparatus 100 automatically measures the inside diameter of a hole to be measured even when the hole to be measured is inclined from the vertical direction.

Figure 20:
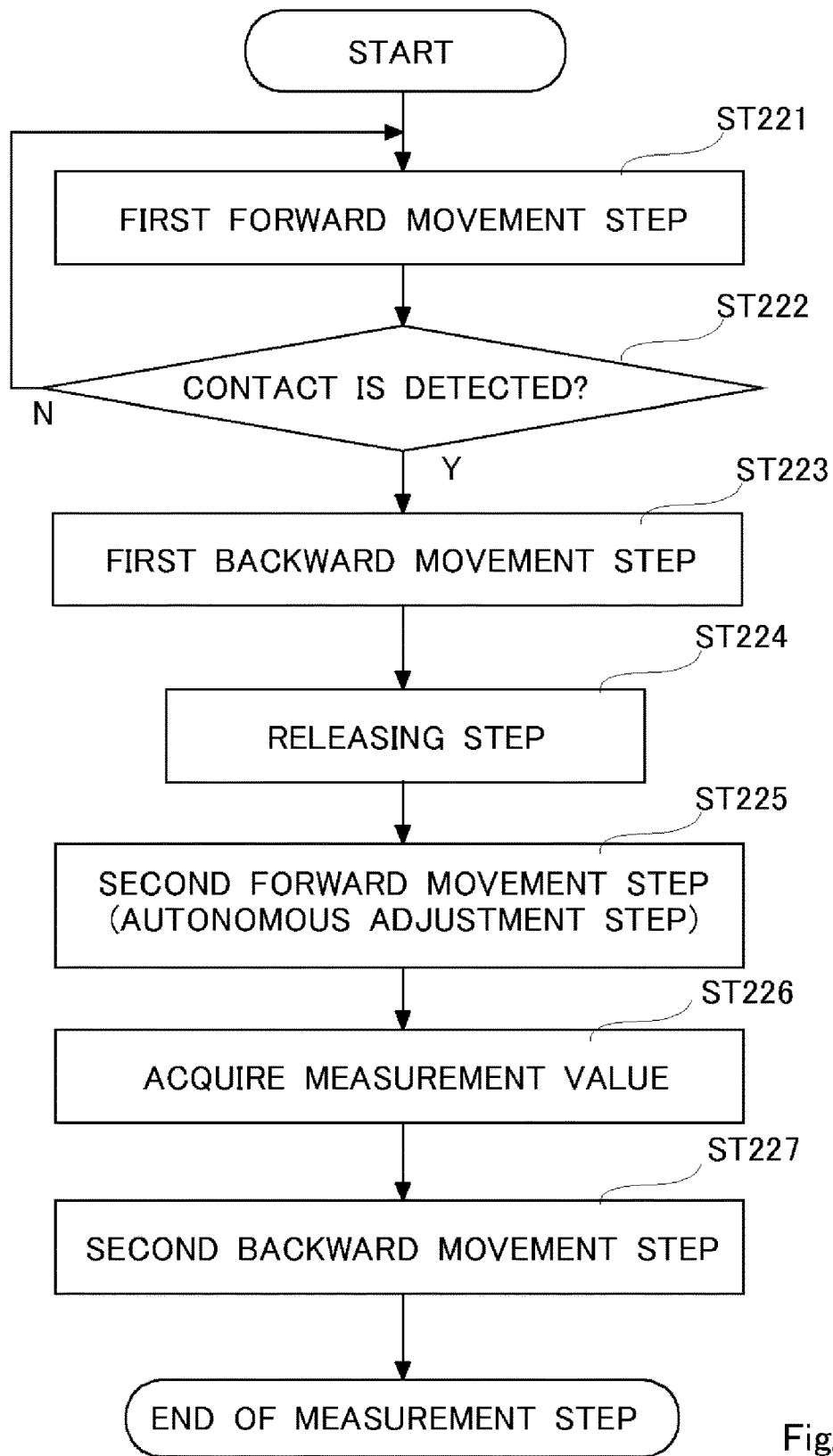
FIG. 20 is a flowchart showing an operating procedure of a measurement step according to a second exemplary embodiment.

FIG. 20 is a flowchart showing an operating procedure of a measurement step according to the second exemplary embodiment.

Since a hole to be measured is inclined with respect to the vertical direction, in the hole insertion step (ST100) of inserting the electric inside-diameter measuring device 200 into the hole by the robot arm part 130, the electric inside-diameter measuring device 200 is inserted into the hole while being inclined to align the inclination of the hole. Then, since the electric inside-diameter measuring device 200 is inclined, if the holding of the electric inside-diameter measuring device 200 by the restriction means 500 is released, the electric inside-diameter measuring device 200 can be greatly displaced (translated and inclined) by the flexibility of the floating joint part 400.

If the electric inside-diameter measuring device 200 is greatly displaced (translated and inclined), the measuring head part 220 can collide with the inner wall of the hole. In addition, once the electric inside-diameter measuring device 200 is greatly displaced (translated and inclined) in the direction of gravitational force, it can be time-consuming and difficult to autonomously recover from the displacement (translation and inclination) only by the reaction force of the measuring pressure.

Therefore, in the measurement step according to the second exemplary embodiment, a first forward movement step (ST221) is performed before a releasing step (ST224). That is, after performing the first forward movement step (ST221) and detecting that the contact points 250 (one of the contact points 250) have been brought into contact with the inner wall of the hole (ST222: YES), the contact points 250 are moved slightly backward (a first backward movement step (ST223)). The releasing step (ST224) is performed in this state.

By performing he first forward movement step (ST221) first, the contact points 250 are in contact with the inner wall of the hole. Since at least one of the contact points 250 is in contact with the inner wall of the hole, it can be expected that the electric inside-diameter measuring device 200 is not greatly displaced (translated and inclined) even if the holding by the restriction means 500 is released. This allows the automatic inside-diameter measurement to be properly performed even for inclined holes to be measured.

Third Exemplary Embodiment

In the second exemplary embodiment (flowchart in FIG. 20), the releasing step (ST224) is performed after the first backward movement step (ST223), but the releasing step (ST224) may be performed before the first backward movement (ST223).

Figure 21:
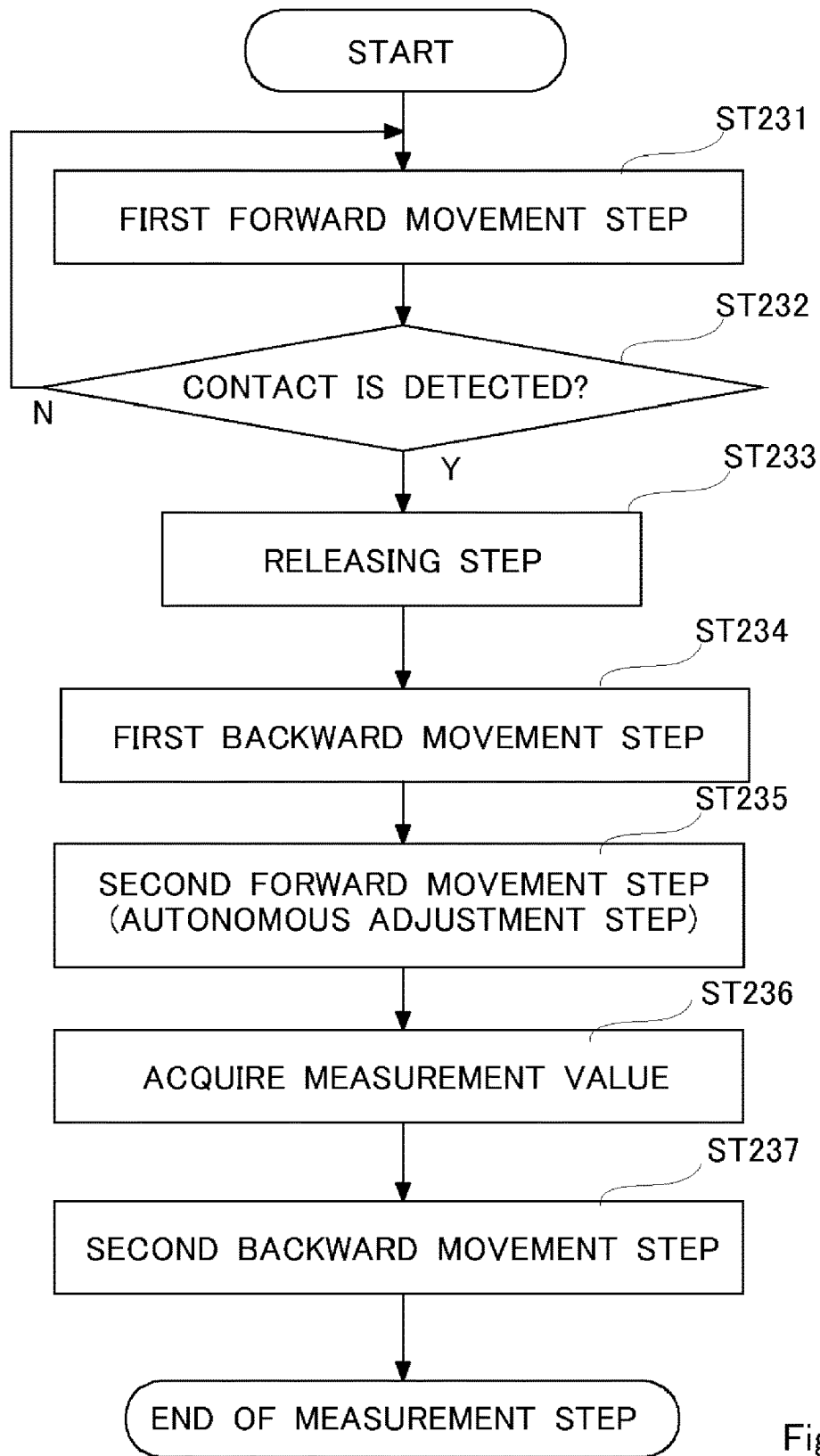
FIG. 21 is a flowchart showing an operating procedure of a measurement step according to a third exemplary embodiment.

As shown in the flowchart in FIG. 21, when it is detected, in a first forward movement step (ST231), that the contact points 250 have been brought into contact with the inner wall of a hole (ST232: YES), the forward movement of the contact points 250 is immediately stopped.

In this state, a releasing step (ST233) is performed. Then, after the contact points 250 are once moved backward (a first backward movement step (ST234)), the contact points 250 are moved forward again to bring the contact points 250 into even contact with the inner wall of the hole with the predetermined measuring pressure while the autonomous adjustment of the position and posture of the electric inside-diameter measuring device 200 is activated. In this order of operation, automatic inside-diameter measurement can still be properly performed on the inside diameter of an inclined hole to be measured, as in the second exemplary embodiment,.

Fourth Exemplary Embodiment

A fourth exemplary embodiment is described.

The basic configuration in the fourth exemplary embodiment is similar to that in the first exemplary embodiment, but the structure of a floating joint part (floating joint mechanism part) 800 is characterized.

Figure 22:
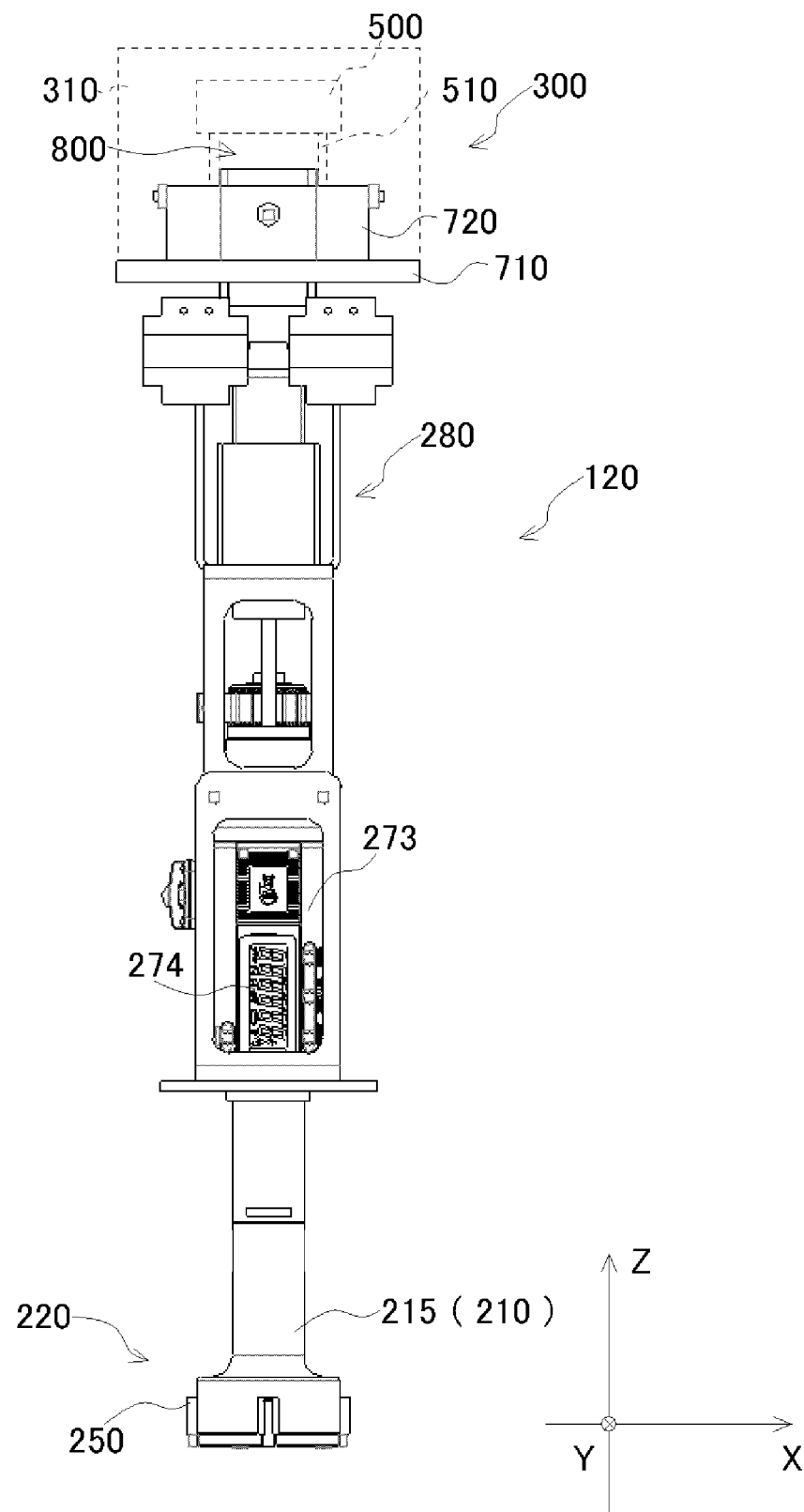
FIG. 22 is a front view of an electric inside-diameter measuring unit according to a fourth exemplary embodiment.

FIG. 22 is a front view of the electric inside-diameter measuring unit 120 according to the fourth exemplary embodiment.

Figure 23:
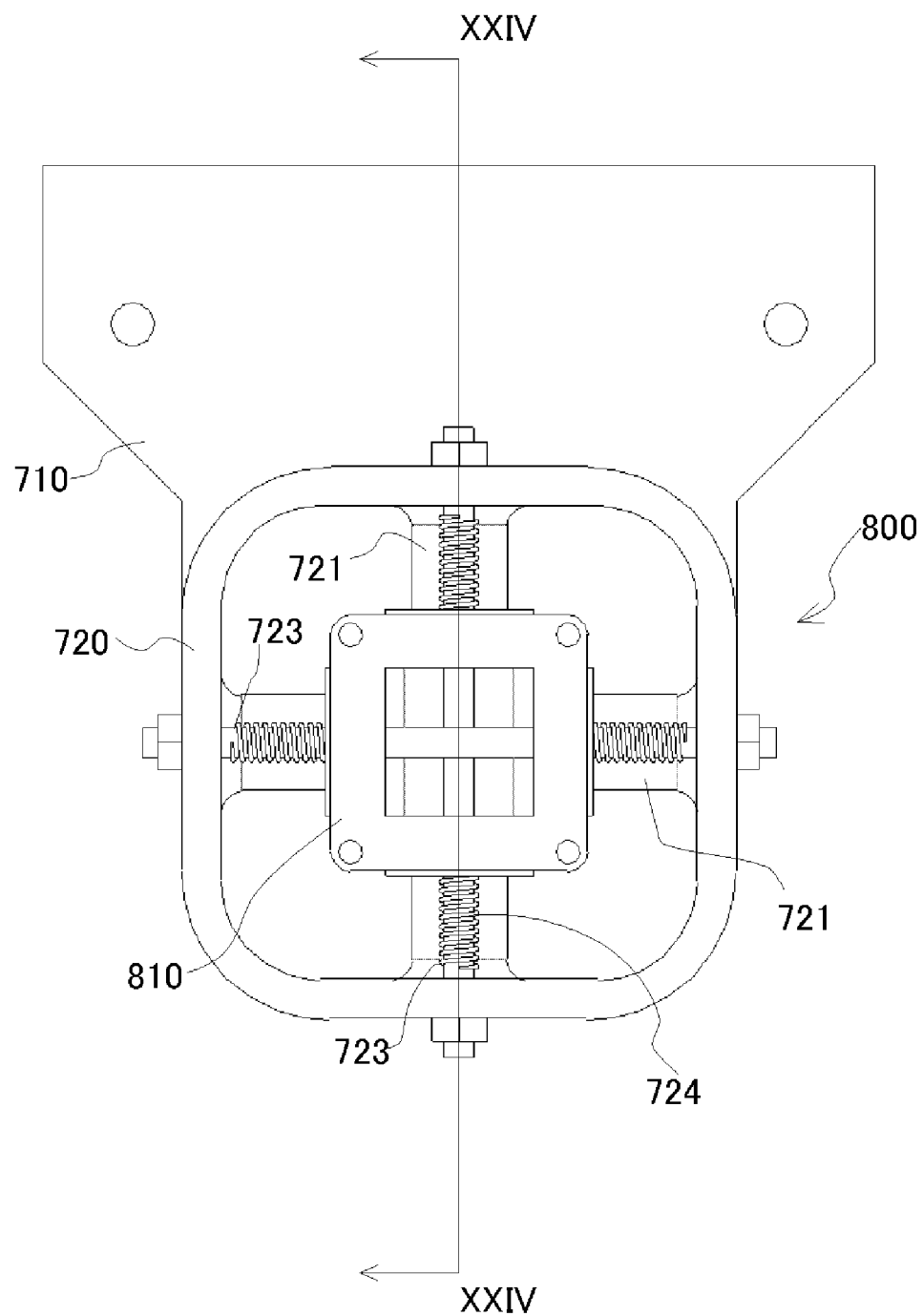
FIG. 23 is a top view (plan view) of a floating joint part according to the fourth exemplary embodiment.

FIG. 23 is a top view (plan view) of the floating joint part 800 according to the fourth exemplary embodiment.

Figure 24:
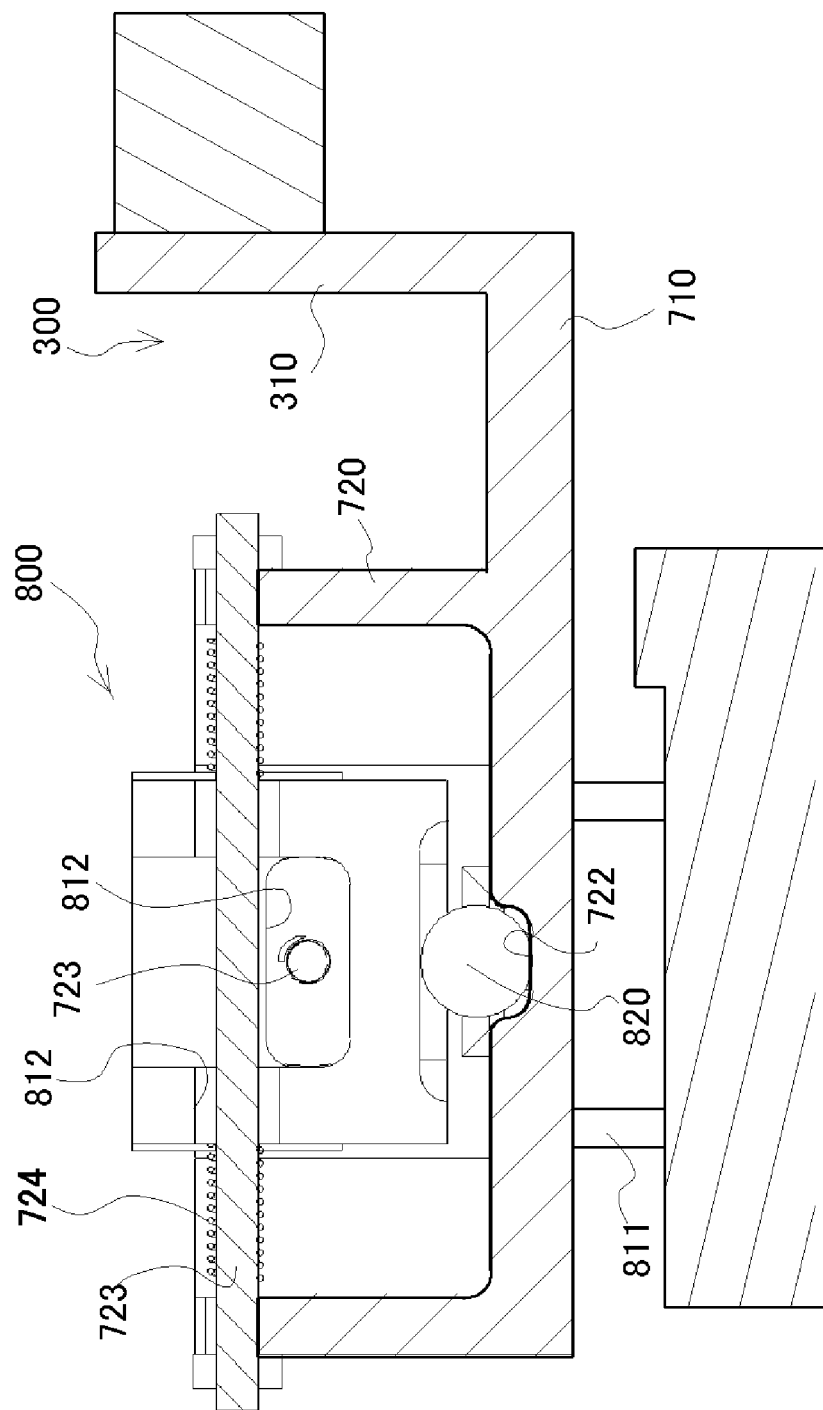
FIG. 24 is a cross-sectional view taken along the XXIV-XXIV line in FIG. 23.

FIG. 24 is a cross-sectional view taken along the line XXIV-XXIV in FIG. 23.

In the fourth exemplary embodiment, the electric inside-diameter measuring device 200 is supported to be suspended from the support frame part 300 via the floating joint part 800 in a posture in which its axis (cylinder axis or rod axis) is vertical.

The support frame part 300 in the fourth exemplary embodiment is an L-shaped member in a side view, as in the first exemplary embodiment, and includes a support column part 310 and a support base part 710.

Here, the support base part 710 has an annular shape having a horizontally-orthogonal wall to form a vertical hole (cylindrical hole).

Since the annular wall surrounds and supports the floating joint part 800, the annular wall is referred to as a support ring part 720. On the lower side face of the support ring part 720, two beams 721 that are bridged in the front-rear and left-right directions and intersect crosswise are provided. As shown in the cross-sectional view in FIG. 24, a recessed part 722 is provided at the intersection of the beams 721.

The floating joint part 800 according to the fourth exemplary embodiment includes a coupling block 810.

The coupling block 810 is fixedly coupled to the electric inside-diameter measuring device 200, and is translated and rotated integrally with the electric inside-diameter measuring device 200.

The coupling block 810 is provided inside the support ring part 720 and surrounded by the wall of the support ring part 720 on the beams 721. The coupling block 810 is square prism-shaped (cube or rectangular). From the four corners of the lower end face of the coupling block 810, four suspension rods 811 are vertically suspended, and the suspension rods 811 are coupled to the upper end of the electric inside-diameter measuring device 200. That is, the electric inside-diameter measuring device 200 is suspended from the coupling block 810 via the suspension rods 811.

As a rotation-allowing mechanism part of the floating joint part 800, a sphere 820 is provided between the coupling block 810 and the support base part 710.

The sphere 820 is placed in the recessed part 722 of the support base part 710, and the coupling block 810 is placed on the top of the sphere 820.

The coupling block 810 placed on the sphere 820 allows rotation of the coupling block 810.

Figure 25:
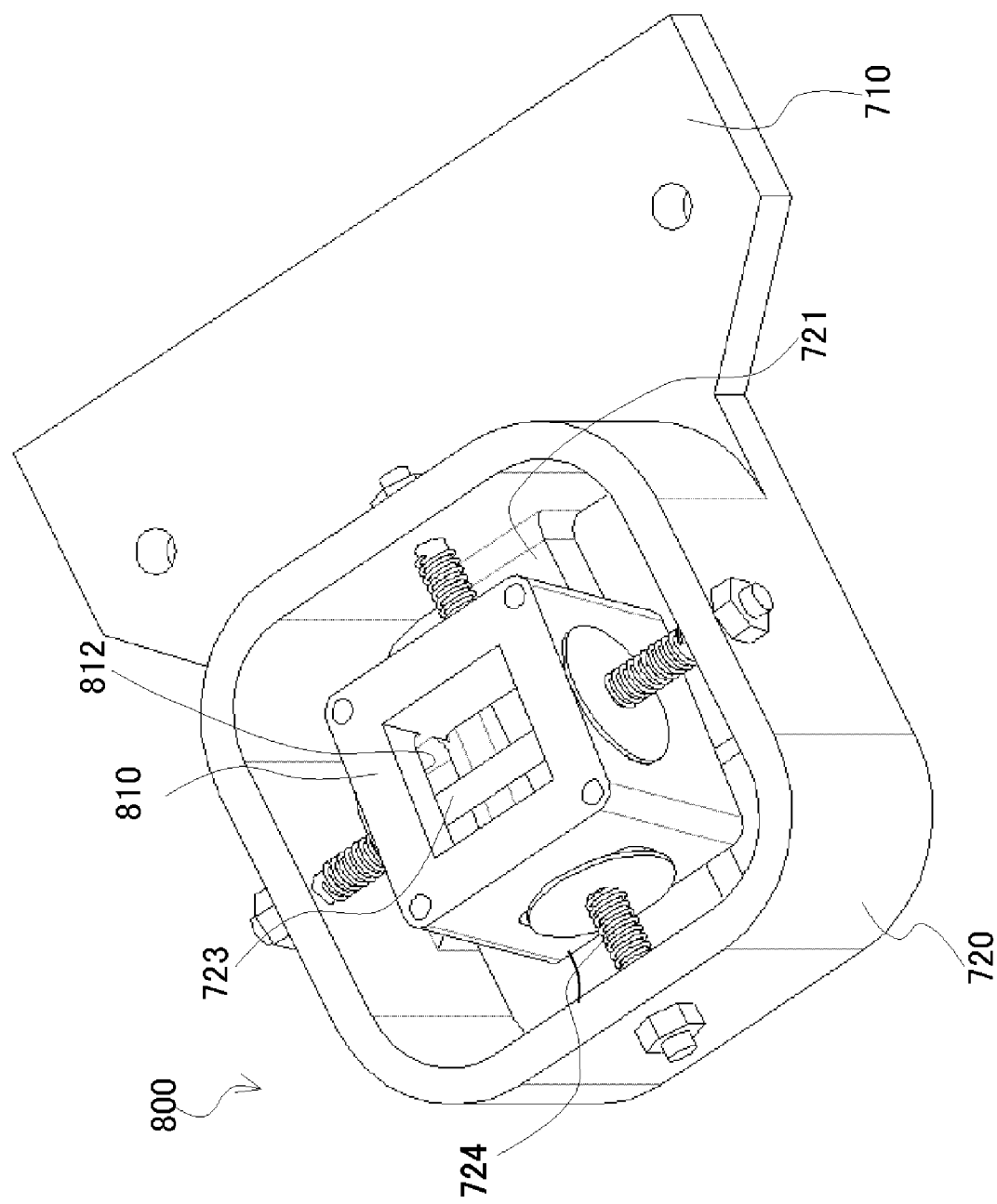
FIG. 25 is a perspective view when a coupling block according to the fourth exemplary embodiment is rotated and displaced with respect to a support frame part (support base part)

FIG. 25 is a perspective view when the coupling block 810 is rotated and displaced with respect to the support frame part 300 (support base part 710).

Figure 26:
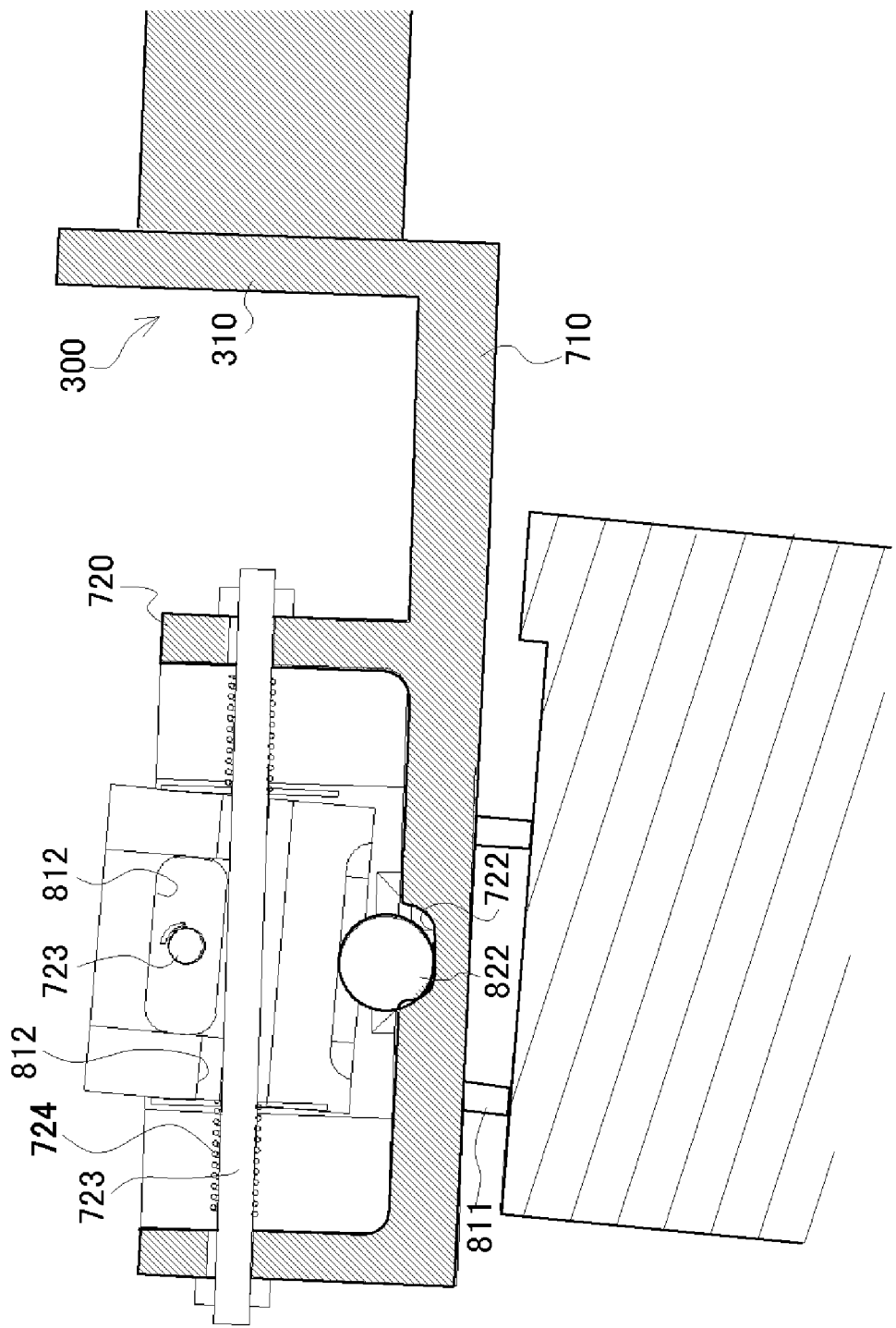
FIG. 26 is a cross-sectional view when the coupling block according to the fourth exemplary embodiment is rotated and displaced with respect to the support frame part (support base part)

FIG. 26 is a cross-sectional view when the coupling block 810 is rotated and displaced with respect to the support frame part 300 (support base part 710).

The bottom face of the coupling block 810 is provided with a platform (a ring-shaped, protruding edge) to prevent the coupling block 810 from coming off the sphere 820. Although pins may be used instead of the sphere if they only allow rotation of the coupling block 810, it is preferable to use the sphere 820 because it does not inhibit the translation of the coupling block 810.

The support ring part 720 is provided with two guide shafts 723 that extend horizontally and intersect crosswise. The coupling block 810 is provided with two guide holes 812 in the front-rear and left-right directions to receive the two crossed guide shafts 723. The guide holes 812 are formed into long holes to allow the guide shafts 723 to guide the horizontal translation of the coupling block 810.

Figure 27:
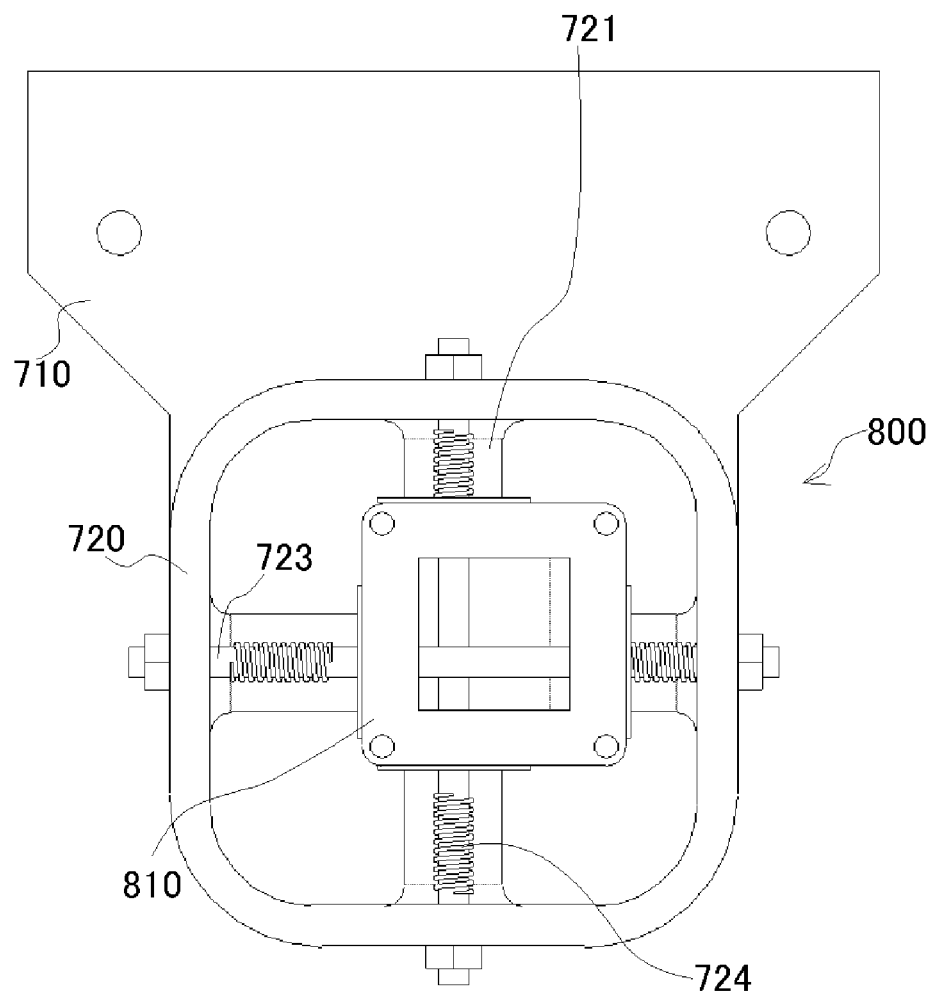
FIG. 27 is a top view (plan view) when the coupling block according to the fourth exemplary embodiment is horizontally translated.

FIG. 27 is a top view (plan view) when the coupling block 810 is translated in the horizontal direction.

The guide holes 812 also have some width in the height direction in order for the guide shafts 723 not to inhibit the coupling block 810 from rotating.

In order to center (balance) the normal position of the coupling block 810, four springs (coil springs) 724 are interposed between the coupling block 810 and the inner wall of the support ring part 720. Here, the springs (coil springs) 724 are disposed between the coupling block 810 and the inner wall of the support ring part 720 by winding the springs (coil springs) 724 around the guide shafts 723.

Here, the guide shafts 723 and the guide holes 812 constitute a translation-allowing mechanism part that allows translation of the coupling block 810.

The translation-allowing mechanism part may be constituted by providing the guide shafts to the coupling block 810 and providing the guide holes in the support ring part 720.

The restriction means 500 may directly restrict the electric inside-diameter measuring device 200 by clamping the electric inside-diameter measuring device 200 itself with the clamping pieces 510, as in the first exemplary embodiment, or may indirectly restrict the electric inside-diameter measuring device 200 by restricting the coupling block 810, for example.

The floating joint part 800 according to the fourth exemplary embodiment also allows translation and rotation of the electric inside-diameter measuring device 200 with respect to the support frame part 300. That is, even if there is an axial misalignment (inclination and distortion) between the electric inside-diameter measuring device 200 and a hole to be measured, the floating joint part 800 allowing the rotation and translation allows the electric inside-diameter measuring device 200 to autonomously adjust its own position and posture.

Compared with the floating joint part 400 according to the first exemplary embodiment, the floating joint part 800 according to the fourth exemplary embodiment has fewer components because the coupling block 810 is a block that combines rotation and translation.

Even if the floating joint part 800 according to the fourth exemplary embodiment is attached to the electric inside-diameter measuring device 200, the overall size increase can be suppressed. For example, since the floating joint part 800 according to the fourth exemplary embodiment is small in size, even if the floating joint part 800 according to the fourth exemplary embodiment is disposed above the electric inside-diameter measuring device 200, the increase in the overall size of the electric inside-diameter measuring unit 120 is suppressed and does not have an extreme effect on the variation of the center of gravity. Therefore, by disposing the floating joint part 800 above the electric inside-diameter measuring device 200 instead of disposing the floating joint part on the side of the electric inside-diameter measuring device 200, the automatic inside-diameter measuring apparatus 100 according to the fourth exemplary embodiment is suitable for automatic inside-diameter measurement for deep holes, such as measurement of the inside diameter near the bottom of a deep hole.

Fifth Exemplary Embodiment

A fifth exemplary embodiment is described.

The basic configuration in the fifth exemplary embodiment is similar to that in the first exemplary embodiment, but the structure of a floating joint part (floating joint mechanism part) 900 is characterized.

Figure 28:
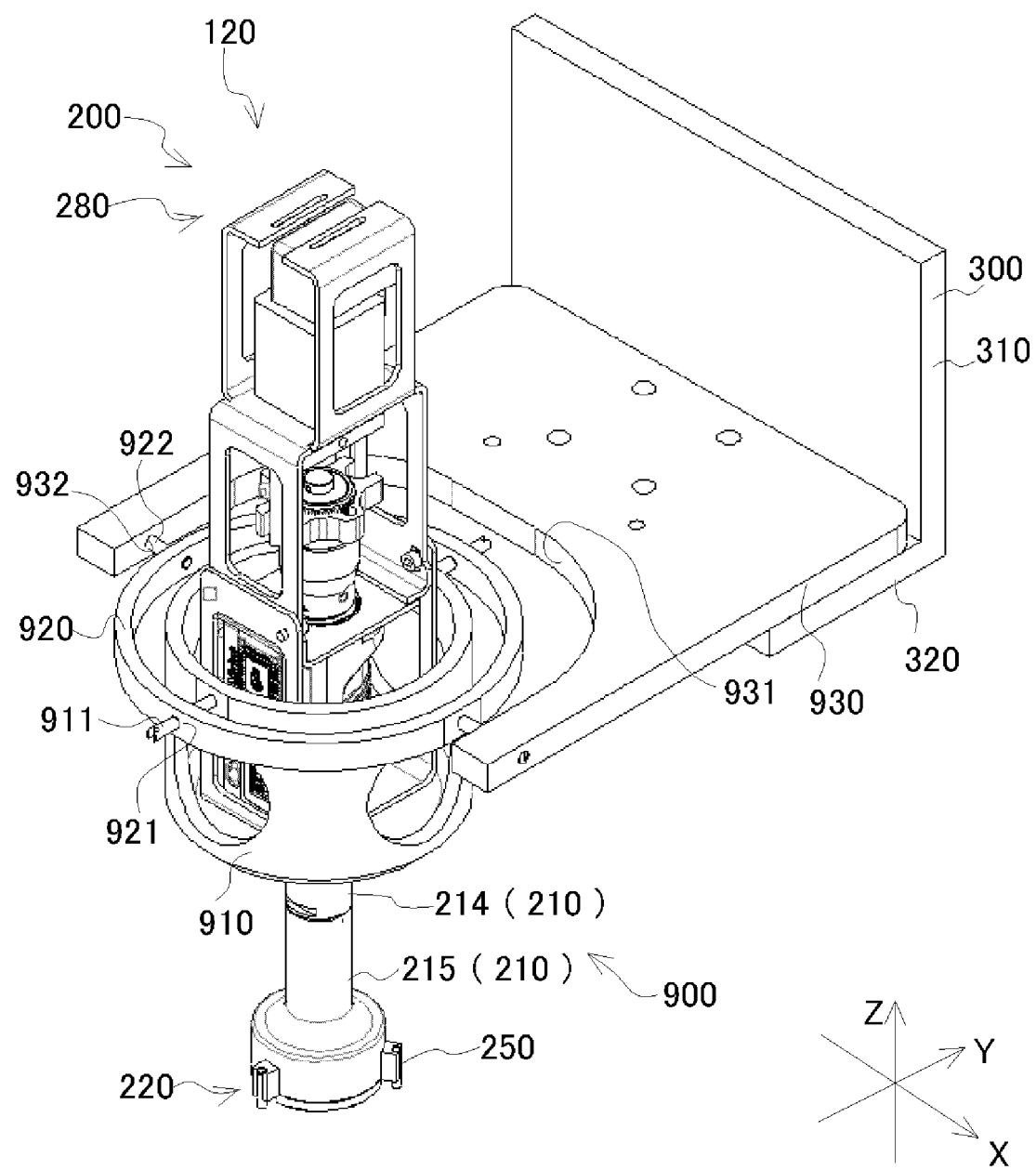
FIG. 28 is a perspective view of an electric inside-diameter measuring unit according to a fifth exemplary embodiment.

FIG. 28 is a perspective view of the electric inside-diameter measuring unit 120 according to the fifth exemplary embodiment.

Figure 29:
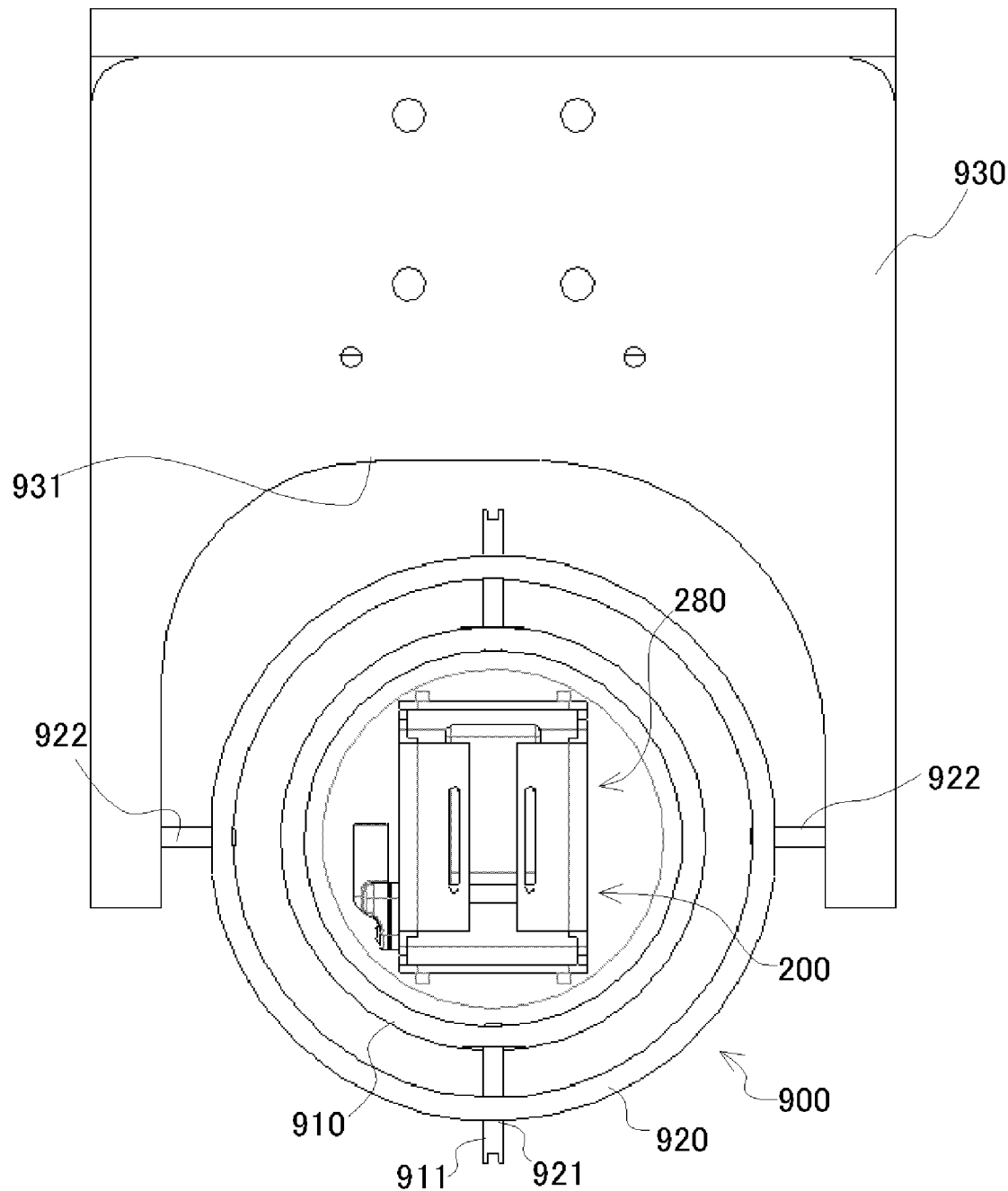
FIG. 29 is a top view (plan view) of the electric inside-diameter measuring unit according to the fifth exemplary embodiment.

FIG. 29 is a top view (plan view) of the electric inside-diameter measuring unit 120 according to the fifth exemplary embodiment.

In the fifth exemplary embodiment, the electric inside-diameter measuring device 200 is supported by the support frame part 300 via the floating joint part 900 in a posture in which its axis (the cylinder axis or the axis of the rod 230) is vertical.

The structure of the floating joint part 900 according to the fifth exemplary embodiment is described below.

The floating joint part 900 includes a first floating coupling body 910, a second floating coupling body 920, and a third floating coupling body 930.

The first floating coupling body 910 is cup-shaped and is referred to as the first floating coupling cup 910. The electric inside-diameter measuring device 200 is received inside the cup-shaped interior, and the first floating coupling cup 910 and the electric inside-diameter measuring device 200 are fixedly coupled. The measuring head part 220 corresponding to the lower cylinder case part 214 and the head cylinder part 215 of the electric inside-diameter measuring device 200 protrudes downward from the bottom of the first floating coupling cup 910. The first floating coupling cup 910 includes a first coupling shaft 911 protruding on both sides in the front-rear direction (Y-axis).

The second floating coupling body 920 is a ring-shaped member and is referred to as the second floating coupling ring 920. The second floating coupling ring 920 is provided to surround the first floating coupling cup 910 in a direction perpendicular to the axis of the electric inside-diameter measuring device 200. The second floating coupling ring 920 includes a hole provided in the front-rear direction (Y-axis direction). This hole is for bearing the first coupling shaft 911 of the first floating coupling cup 910 and referred to as a first coupling hole 921. The first coupling hole 921 allows the first coupling shaft 911 to rotate about the axis and the first coupling shaft 911 to slide in the axial direction. That is, the electric inside-diameter measuring device 200 and the first floating coupling cup 910 can be translated in the front-rear direction (Y-axis direction) and be rotated around the Y-axis with respect to the second floating coupling ring 920.

The second floating coupling ring 920 is provided with a second coupling shaft 922 protruding on both sides in the left-right direction (X-axis).

The third floating coupling body 930 is a horizontally-parallel plate member that supports the second floating coupling ring 920 to allow translation and rotation of the second floating coupling ring 920, and is referred to as the third floating coupling plate 930. The third floating coupling plate 930 includes a U-shaped depressed (recessed) curved part 931 to receive the electric inside-diameter measuring device 200 in the horizontal direction. At the tips of the arms constituting both sides of the curved part 931, holes drilled in the left-right direction (X-axis) are provided.

Each hole is for bearings the second coupling shaft 922 of the second floating coupling ring 920, and is referred to as a second coupling hole 932. The second coupling hole 932 allows the second coupling shaft 922 to rotate about the axis and the second coupling shaft 922 to slide in the axial direction. That is, the electric inside-diameter measuring device 200, the first floating coupling cup 910, and the second floating coupling ring 920 can be translated in the left-right direction (X-axis direction) and rotated about the X-axis with respect to the third floating coupling plate 930.

The third floating coupling plate 930 is coupled to the support base part 710 of the support frame part 300.

When considering a first virtual straight line, which is a virtual extension of the first coupling shaft 911, and a second virtual straight line, which is a virtual extension of the second coupling shaft 922, the intersection of the first and second virtual lines is preferably substantially aligned with the center of gravity of the electric inside-diameter measuring device 200.

The floating joint part 900 according to the fourth exemplary embodiment also allows translation and rotation of the electric inside-diameter measuring device 200 with respect to the support frame part 300. That is, even if there is an axial misalignment (inclination and distortion) between the electric inside-diameter measuring device 200 and a hole to be measured, the floating joint part 900 allowing the rotation and translation allows the electric inside-diameter measuring device 200 to autonomously adjust its own position and posture.

Figure 30:
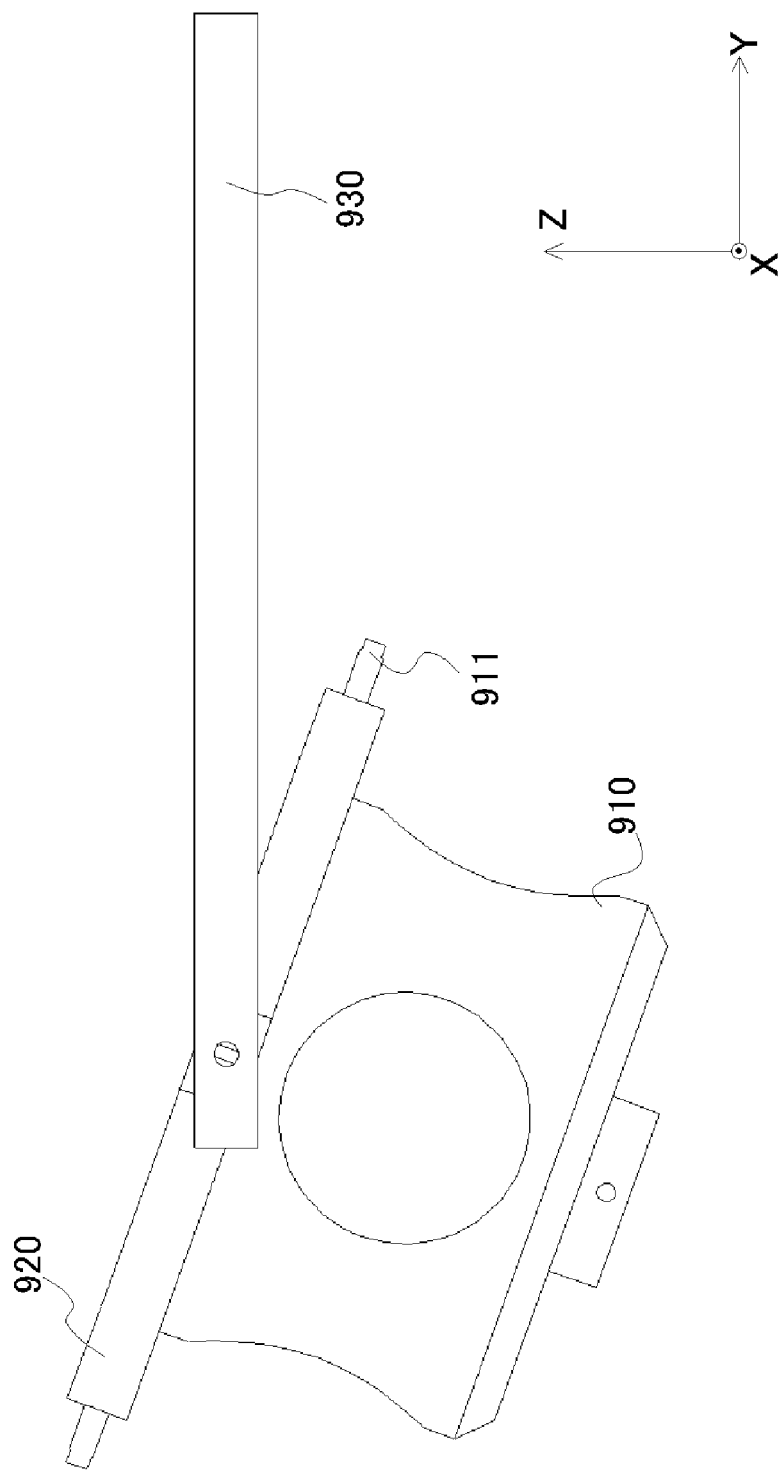
FIG. 30 is a view when a first floating coupling cup according to the fifth exemplary embodiment is rotated around an X-axis.

FIG. 30 is a view when the first floating coupling cup 910 is rotated about the X axis.

Figure 31:
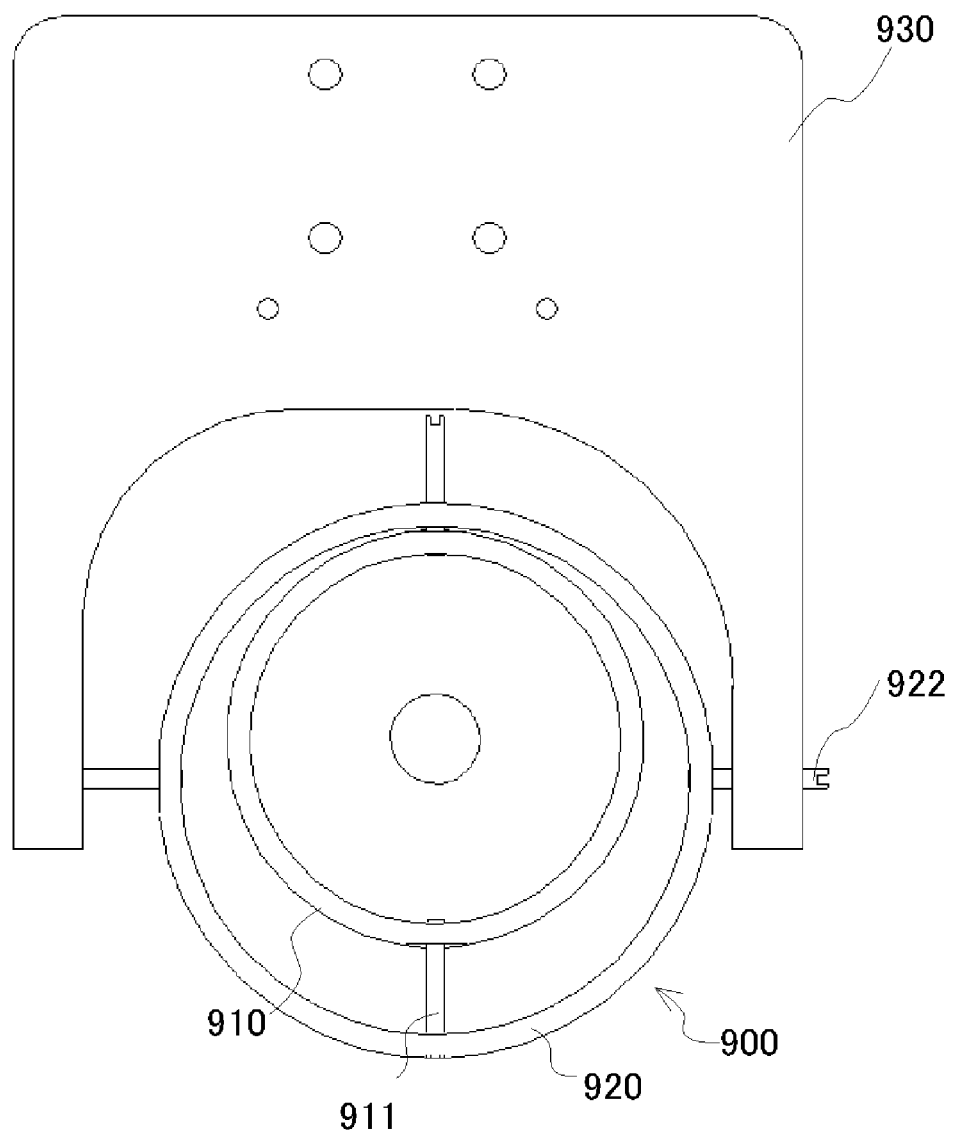
FIG. 31 is a view when the first floating coupling cup according to the fifth exemplary embodiment is translated in a horizontal plane.

FIG. 31 is a view when the first floating coupling cup 910 is translated in the horizontal plane.

For ease of viewing the drawings, the electric inside-diameter measuring device 200 is omitted in FIGS. 30 and 31.

With the structure of the floating joint part 900 according to the fifth exemplary embodiment, it is easier to align the rotation axis and translation axis with the center of gravity of the electric inside-diameter measuring device 200. This makes the posture of the electric inside-diameter measuring device 200 more stable.

As described above, according to the present invention, inside-diameter measurement, which has been operated manually, can be automated, which enables full automation of the inside-diameter measurement. Automatic in-line measurement of hole diameters can be introduced in machining factories or the like, and is expected to significantly improve production efficiency.

Sixth Exemplary Embodiment

A sixth exemplary embodiment is described.

Figure 32:
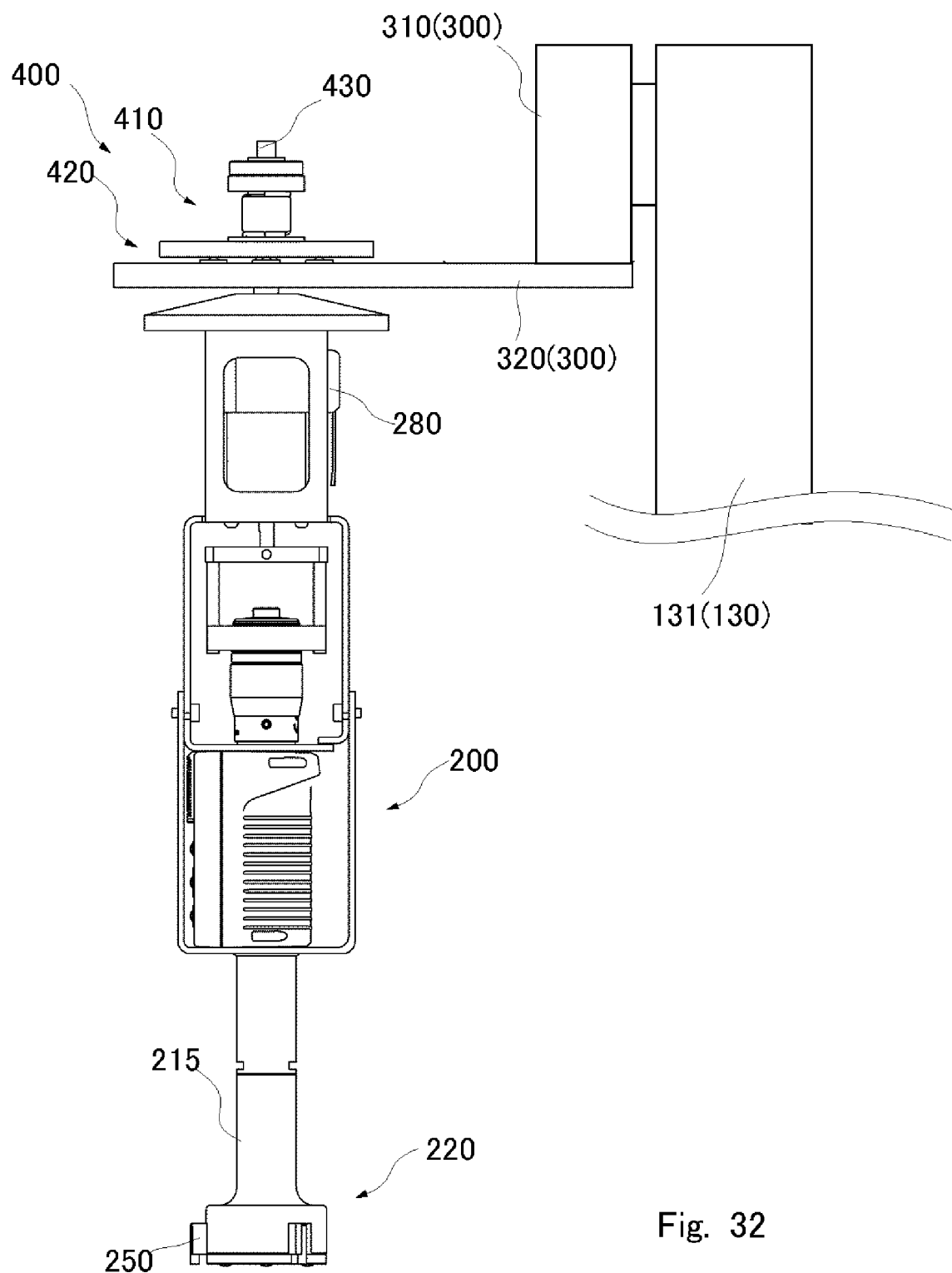
FIG. 32 is an exterior side view according to a sixth exemplary embodiment.

FIG. 32 is a side view of the overall appearance according to the sixth exemplary embodiment.

Figure 33:
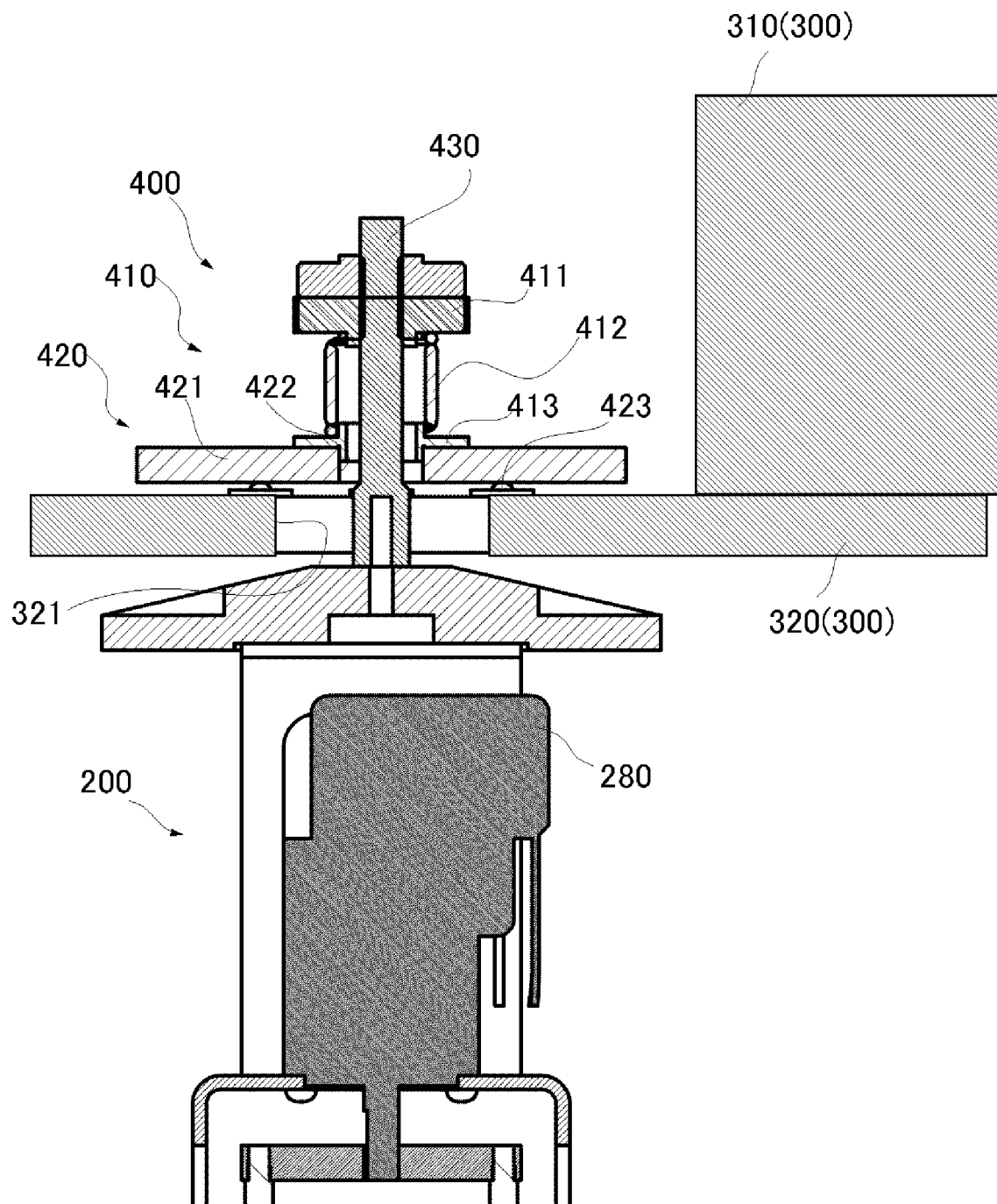
FIG. 33 is an enlarged cross-sectional view of a floating joint part according to the sixth exemplary embodiment.

FIG. 33 is an enlarged cross-sectional view of a floating joint part according to the sixth exemplary embodiment.

The basic configuration in the sixth exemplary embodiment is similar to that in the first exemplary embodiment, but a floating joint part 400 is disposed above the electric inside-diameter measuring device 200 in the sixth exemplary embodiment. That is, the electric inside-diameter measuring device 200 is supported to be suspended from the support frame part 300 via the floating joint part 400. The configuration is substantially the same as that in the first exemplary embodiment, except that almost the entire electric inside-diameter measuring device 200 is below the support frame part 300 and is suspended and supported from the support frame part 300. In the sixth exemplary embodiment (FIGS. 32 and 33), the same reference signs are assigned to the elements corresponding to the first exemplary embodiment.

In FIGS. 32 and 33, a suspension rod 430 that suspends the electric inside-diameter measuring device 200 extends toward the top of the electric inside-diameter measuring device 200. The suspension rod 430 is on the central axis of the electric inside-diameter measuring device 200, and the suspension rod 430 is fixedly coupled to the electric inside-diameter measuring device 200. (The electric inside-diameter measuring device (electric inside-diameter measuring part) 200 may be interpreted to include the suspension rod 430.) The suspension rod 430 passes through the first insertion hole 321 of the support base part 320, and the first spring holder 411 is coupled to the upper end of the suspension rod 430. The floating joint part 400 is constituted between the first spring holder 411 and the support base part 320. That is, the floating joint part 400 is roughly constituted by a ball roller 423 provided in the support base part 320, a horizontal plate (translation body) 421 provided to be translated by the ball roller 423, the second spring holder 413 provided in the second insertion hole 422 of the horizontal plate (translation body) 421, and the coil spring 412 disposed between the first spring holder 411 and the second spring holder 413.

Similarly to the first exemplary embodiment, the sixth exemplary embodiment with this configuration and arrangement enables the operation of autonomously adjusting the position and posture of the electric inside-diameter measuring device 200 by the action of the floating joint part 400. In addition, according to the sixth exemplary embodiment, the floating joint part 400 is disposed above the electric inside-diameter measuring device 200, which make it suitable for automatic inside-diameter measurement for deep holes, such as measurement of the inside diameter near the bottom of a deep hole.

The present invention is not limited to the above exemplary embodiments, and can be appropriately modified without departing from the gist.

In the description of the above exemplary embodiments, when the rod 230 is driven, in addition to screw feeding by rotation, a linear motion may be used to pull the rod 230 up and down.

In the above exemplary embodiments, a multi-joint robot arm is described as an example of a moving means, but the moving means does not need to be a large-scale device, but may be a one-dimensional driving apparatus with an up-and-down elevation mechanism. For example, the one-dimensional driving apparatus includes a column, a slider that slides along the column, a motor that drives the slider, and a power transmission mechanism (a ball screw, a belt pulley, or the like) that couples the motor and the slider.

In the above exemplary embodiments, what is called a hole test (Borematic (registered trademark)) is described as an example of the structure of the tip of the inside-diameter measuring part, but any inside-diameter measuring device with the contact point 250 that moves forward and backward in conjunction with the rod 230 to be brought into contact with the inside wall is applicable. For example, in the case of the head of a cylinder gauge, the head includes one contact point 250 that moves forward and backward, an anvil that is coaxially opposed to the contact point 250 for centering, and guide heads on both sides in the orthogonal direction.

In the above exemplary embodiments, an inside-diameter measuring device (inside-diameter measuring part) is described as an example of a measuring device (measuring part). However, instead of an inside-diameter measuring device (inside-diameter measuring part), a contact-type measuring device (measuring part) that measures the dimensions (inside and outside dimensions) of a workpiece (object to be measured) may be used.

If a measuring device (measuring part) is provided with a movable element (which is variously called as a contact point, a measuring jaw, a spindle, or the like) that is displaceable with respect to a fixed element and measures the dimensions of a workpiece by bringing the contact point into contact with the workpiece or by clamping the workpiece with the contact point, such a measuring device is applicable to the above exemplary embodiment. The measuring device (measuring part) can autonomously adjust its position or posture by the floating joint part (floating joint mechanism part) using the reaction force applied to the contact point from the workpiece when the contact point is in contact with the workpiece with a predetermined measuring pressure, or when the contact point clamps the workpiece with a predetermined measuring pressure. (Therefore, the direction in which the translation-allowing mechanism part allows translation of an object to be supported (measuring device) is approximately parallel to the direction in which the contact point is brought into contact with the workpiece (or approximately parallel to the direction of the reaction force applied to the measuring device from the workpiece).) Examples of the measuring device (measuring part) include calipers, micrometer heads, micrometers, digital dial gauges (indicators), test indicators (lever-type dial gauges), and the like.

In the first, fourth, and fifth exemplary embodiments, different types of floating joint parts 400, 800, and 900 have been described, respectively. They may be used individually or in combination.

For example, the floating joint part 400 according to the first exemplary embodiment may be installed on the side of the electric inside-diameter measuring device 200, and the floating joint part 800 according to the fourth exemplary embodiment may be further installed above the electric inside-diameter measuring device 200.

Similarly, for example, the floating joint part 900 according to the fifth exemplary embodiment may be installed on the side of the electric inside-diameter measuring device 200, and the floating joint part 800 according to the fourth exemplary embodiment may be further installed above the electric inside-diameter measuring device 200.

Because of the length of an inside-diameter measuring device, if the inside-diameter measuring device is supported by a flexible joint, the inside-diameter measuring device sways unsteadily, inclines greatly, or slides back and forth or left and right, and is difficult to stabilize.

On the other hand, if the rigidity of the joint is increased, autonomous position and posture adjustment cannot be performed only with weak measuring pressure, which needs to introduce advanced feedback control, and the like. However, this requires the introduction of an expensive system and a long time for position and posture adjustment. Therefore, by coupling and supporting the inside-diameter measuring device at two points of the side and the top of the inside-diameter measuring device with appropriate floating joint parts, it is expected that stability can be achieved while flexibility of the joints can be maintained.

The above exemplary embodiments assume that the electric inside-diameter measuring device is inserted into a hole from the top of the hole while a nearly vertical posture is maintained, but the electric inside-diameter measuring device may be used in a horizontal posture as well as the vertical posture, or it may approach a workpiece (hole to be measured) from below to top in an upside-down vertical posture.

100 Automatic inside-diameter measuring apparatus
110 Measuring-apparatus main body
120 Electric inside-diameter measuring unit
200 Electric inside-diameter measuring device
210 Cylinder case part
211 Upper cylinder case part
212 Female thread
213 Middle cylinder case part
214 Lower cylinder case part
215 Head cylinder part
216 Plate spring
220 Measuring head part
230 Rod
231 upper rod
232 Feed screw
233 Lower rod
240 Thimble part
241 Thimble sleeve
242 Ratchet sleeve
243 Coil spring (load regulation elasticity)
250 Contact point
251 Tapered surface
252 Round shaft tip
260 Displacement detection part
261 Rotor
262 Stator
270 Outer case part
271 Outer case body part
272 Outer case upper part
273 Display unit
274 Display part
280 Electric drive unit
300 Support frame part
310 Support column part
320 Support base part
321 First insertion hole
400 Floating joint part (floating joint mechanism part)
410 Rotation-allowing mechanism part
411 First spring holder
412 Coil spring
413 Second spring holder
414 Ring hole
420 Translation-allowing mechanism part
421 Horizontal plate
422 Second insertion hole
423 Ball roller
430 Suspension rod
500 Restriction means
510 Clamping piece
600 Collision detection part
601 Fixed plate
602 Mounting plate
610 Linear guide
611 Groove frame
612 Slide body
620 Coil spring
630 Contact sensor
631 Contact detection block
632 Ball plunger
132 Force sensor part
130 Multi-joint robot arm part (robot arm part)
131 Hand part
140 Control unit
150 Measurement operation control unit
151 Restriction control unit
152 Drive control unit
153 Measurement value acquisition unit
160 Robot arm drive control unit
170 Central control unit
710 Support base part
720 Support ring part
721 Beam
722 Recessed part
723 Guide shaft
724 Spring (coil spring)
800 Floating joint part (floating joint mechanism part)
810 Coupling block
811 Suspension rod
812 Guide hole
820 Sphere
900 Floating joint part (floating joint mechanism part)
910 First floating coupling cup (first floating coupling body)
911 First coupling shaft
920 Second floating coupling ring (second floating coupling body)
921 First coupling hole
922 Second coupling shaft
930 Third floating coupling plate (third floating coupling body)
931 Curved part
932 Second coupling hole

The invention claimed is:

1. An inside-diameter measuring unit comprising:
an inside-diameter measuring part including a contact point configured to move forward and backward in a direction perpendicular to a cylinder axis of a cylinder case part, the inside-diameter measuring part configured to bring the contact point into contact with an inner wall of a hole to be measured to measure an inside diameter of the hole while the inside-diameter measuring part is inserted in the hole;
a support frame part configured to support the inside-diameter measuring part; and
a floating joint part interposed between the support frame part and the inside-diameter measuring part to allow relative translation and rotation of the inside-diameter measuring part with respect to the support frame part, wherein
the floating joint part includes:
a rotation-allowing mechanism part configured to allow the rotation of the inside-diameter measuring part with respect to the support frame part; and
a translation-allowing mechanism part configured to allow translational displacement of the inside-diameter measuring part with respect to the support frame part
the rotation-allowing mechanism part includes a flexible body configured to allow deformation in a direction in which the inside-diameter measuring part is inclined the translation-allowing mechanism part includes a translation body configured to allow translation of the inside-diameter measuring part in a direction intersecting the cylinder axis of the cylinder case part the flexible body has one end coupled to the inside-diameter measuring part the flexible body has the other end coupled to the translation body, and the translation body is supported in such a manner as to be translatable with respect to the support frame part.

2. The inside-diameter measuring unit according to claim 1, wherein the support frame part includes a support base part the support base part includes a first insertion hole through which the inside-diameter measuring part is inserted the translation body includes a second insertion hole through which the inside-diameter measuring part is inserted the inside-diameter measuring part is supported while being inserted in the first insertion hole and the second insertion holes, and the floating joint part includes a bearing provided around the first insertion hole and the second insertion hole between the translation body and the support base part to allow translation of the translation body with respect to the support base part.

3. The inside-diameter measuring unit according to claim 2, wherein the first insertion hole has a larger diameter than a diameter of the second insertion hole the diameter of the first insertion hole has a size allowing the translation of the inside-diameter measuring part, and the diameter of the second insertion hole has a size allowing the inclination of the inside-diameter measuring part.

4. The inside-diameter measuring unit according to claim 1, wherein the flexible body is an elastic body provided to surround the inside-diameter measuring part between the inside-diameter measuring part and the translation body.

5. The inside-diameter measuring unit according to claim 4, wherein the elastic body is a spring provided to surround the inside-diameter measuring part.

6. The inside-diameter measuring unit according to claim 1, wherein the translation body is disposed above the support base part the flexible body has a lower end coupled to the translation body as the other end, and the flexible body has an upper end coupled to the inside-diameter measuring part as the one end.

7. The inside-diameter measuring unit according to claim 1, wherein a position at which the one end of the flexible body is coupled to the inside-diameter measuring part corresponds to a center of gravity of the inside-diameter measuring part.

8. The inside-diameter measuring unit according to claim 1, further includes an electric drive unit configured to move the contact point forward and backward.

9. The inside-diameter measuring unit according to claim 1, further includes a restriction means for clamping the inside-diameter measuring part from a direction intersecting the cylinder axis, wherein the restriction means is configured to clamp and hold the inside-diameter measuring part when the inside-diameter measuring part is not inserted in the hole to be measured, and to release the inside-diameter measuring part when the inside-diameter measuring part is inserted in the hole to be measured.

10. The inside-diameter measuring unit according to claim 1, wherein the inside-diameter measuring part is supported by the support frame part via the floating joint part when the cylinder axis is oriented in a vertical direction as a reference position.

11. The inside-diameter measuring unit according to claim 1, wherein the support frame part couples the inside-diameter measuring part to a moving means for moving the inside-diameter measuring part.

12. A floating joint mechanism part interposed between an object to be supported and a support frame part configured to support the object to be supported, the floating joint mechanism part configured to allow relative translation and rotation of the object to be supported with respect to the support frame part, the floating joint mechanism part comprising:

a rotation-allowing mechanism part configured to allow the rotation of the object to be supported with respect to the support frame part; and a translation-allowing mechanism part configured to allow translational displacement of the object to be supported with respect to the support frame part, wherein the rotation-allowing mechanism part includes a flexible body configured to allow deformation in a direction in which the object to be supported is inclined the translation-allowing mechanism part includes a translation body configured to allow translation of the object to be supported the flexible body has one end coupled to the object to be supported the flexible body has the other end coupled to the translation body, and the translation body is supported in such a manner as to be translatable with respect to the support frame part.

13. A measuring unit comprising:

a measuring part configured to bring a contact point into contact with an object to be measured to measure a dimension of the object to be measured;

a support frame part configured to support the measuring part; and a floating joint part interposed between the support frame part and the measuring part to allow relative translation and rotation of the measuring part with respect to the support frame part, wherein the floating joint part includes:

a rotation-allowing mechanism part configured to allow the rotation of the measuring part with respect to the support frame part; and a translation-allowing mechanism part configured to allow translational displacement of the measuring part with respect to the support frame part the rotation-allowing mechanism part includes a flexible body configured to allow deformation in a direction in which the measuring part is inclined the translation-allowing mechanism part includes a translation body configured to allow translation of the measuring part the flexible body has one end coupled to the measuring part the flexible body has the other end coupled to the translation body, and the translation body is supported in such a manner as to be translatable with respect to the support frame part.

* * * * *